United States Patent
Baba et al.

(10) Patent No.: US 8,844,061 B2
(45) Date of Patent: Sep. 23, 2014

(54) SCANNING PROBE MICROSCOPE

(71) Applicants: Shuichi Baba, Tokyo (JP); Masahiro Watanabe, Tokyo (JP); Toshihiko Nakata, Tokyo (JP); Yukio Kembo, Ibaraki (JP); Toru Kurenuma, Ibaraki (JP); Takafumi Morimoto, Ibaraki (JP); Manabu Edamura, Ibaraki (JP); Satoshi Sekino, Ibaraki (JP)

(72) Inventors: Shuichi Baba, Tokyo (JP); Masahiro Watanabe, Tokyo (JP); Toshihiko Nakata, Tokyo (JP); Yukio Kembo, Ibaraki (JP); Toru Kurenuma, Ibaraki (JP); Takafumi Morimoto, Ibaraki (JP); Manabu Edamura, Ibaraki (JP); Satoshi Sekino, Ibaraki (JP)

(73) Assignee: HITACHI, Ltd., Tokyo (JP)

( * ) Notice: Subject to any disclaimer, the term of this patent is extended or adjusted under 35 U.S.C. 154(b) by 0 days.

(21) Appl. No.: 13/726,764

(22) Filed: Dec. 26, 2012

(65) Prior Publication Data
US 2013/0205454 A1   Aug. 8, 2013

Related U.S. Application Data

(62) Division of application No. 12/187,430, filed on Aug. 7, 2008, now Pat. No. 8,342,008.

(30) Foreign Application Priority Data

Dec. 19, 2007   (JP) .................................. 2007-327210

(51) Int. Cl.
*G01Q 60/28*   (2010.01)
*G01Q 10/04*   (2010.01)
*G01Q 60/24*   (2010.01)
*G01Q 10/00*   (2010.01)
*G01Q 60/34*   (2010.01)
*B82Y 35/00*   (2011.01)

(52) U.S. Cl.
CPC ................ *G01Q 10/00* (2013.01); *B82Y 35/00* (2013.01); *G01Q 60/28* (2013.01); *G01Q 60/34* (2013.01)
USPC ................................... 850/35; 850/3; 850/33

(58) Field of Classification Search
CPC .............................. G01Q 60/28; G01Q 10/04
See application file for complete search history.

(56) References Cited

U.S. PATENT DOCUMENTS

| | | | | |
|---|---|---|---|---|
| 6,223,591 B1 * | 5/2001 | Nakano | ........................... | 73/105 |
| 7,631,548 B2 | 12/2009 | Baba et al. | | |
| 8,342,008 B2 * | 1/2013 | Baba et al. | ........................ | 73/105 |
| 2005/0029450 A1 * | 2/2005 | Hough et al. | .................. | 250/306 |
| 2005/0194534 A1 * | 9/2005 | Kneedler et al. | ............... | 250/307 |
| 2006/0000263 A1 * | 1/2006 | Su et al. | ........................... | 73/105 |
| 2006/0005614 A1 * | 1/2006 | Sahin et al. | ..................... | 73/105 |
| 2006/0284083 A1 * | 12/2006 | Kurenuma et al. | ........... | 250/309 |
| 2007/0084213 A1 * | 4/2007 | Burd et al. | ....................... | 60/776 |
| 2007/0266780 A1 * | 11/2007 | Baba et al. | ........................ | 73/105 |
| 2008/0257024 A1 * | 10/2008 | Watanabe et al. | ............... | 73/105 |
| 2010/0043108 A1 * | 2/2010 | Hirooka et al. | .................. | 850/57 |
| 2010/0175155 A1 * | 7/2010 | Sahin | ................................ | 850/6 |
| 2010/0313312 A1 * | 12/2010 | Dahlen et al. | ................... | 850/20 |

FOREIGN PATENT DOCUMENTS

| | | |
|---|---|---|
| JP | 07-270434 | 10/1995 |
| JP | 11-352135 | 12/1999 |
| JP | 2004-132823 | 4/2004 |
| JP | 2006-329973 | 12/2006 |
| JP | 3925380 | 3/2007 |
| WO | WO 2005022124 A1 * | 3/2005 |

OTHER PUBLICATIONS

J.S. Villarrubia, "Algorithms for Scanned Probe Microscope Image Simulation, Surface Reconstruction and Tip Estimation", Journal of Research of the National Institute of Standards and Technology, vol. 102, No. 4, Jul.-Aug. 1997.

David Keller, "Reconstruction of STM and AFM images distorted by finite-size tips", Surface Science, 253 (Feb. 1991) 353-364.

* cited by examiner

*Primary Examiner* — Jack Berman
*Assistant Examiner* — James Choi
(74) *Attorney, Agent, or Firm* — Antonelli, Terry, Stout & Kraus, LLP.

(57) ABSTRACT

In the case of measuring a pattern having a steep side wall, a probe adheres to the side wall by the van der Waals forces acting between the probe and the side wall when approaching the pattern side wall, and an error occurs in a measured profile of the side wall portion. When a pattern having a groove width almost equal to a probe diameter is measured, the probe adheres to both side walls, the probe cannot reach the groove bottom, and the groove depth cannot be measured. When the probe adheres to a pattern side wall in measurements of a microscopic high-aspect ratio pattern using an elongated probe, the probe is caused to reach the side wall bottom by detecting the adhesion of the probe to the pattern side wall, and temporarily increasing a contact force between the probe and the sample. Also, by obtaining the data of the amount of torsion of a cantilever with the shape data of the pattern, a profile error of the side wall portion by the adhesion is corrected by the obtained data of the amount of torsion.

9 Claims, 26 Drawing Sheets

FIG.22
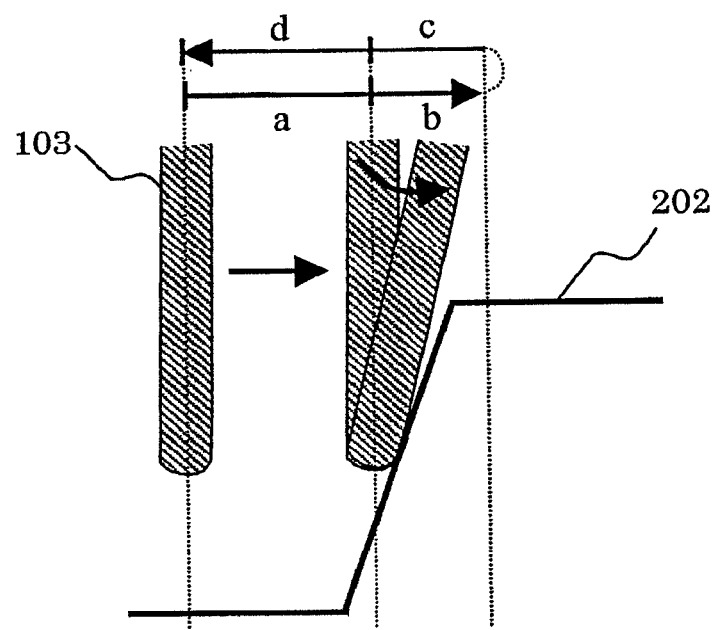
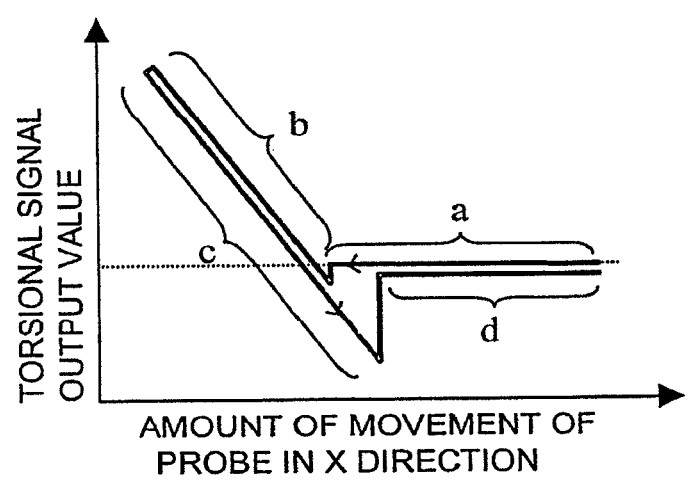

SCANNING PROBE MICROSCOPE

CROSS-REFERENCE TO RELATED APPLICATIONS

This application is a divisional application of U.S. application Ser. No. 12/187,430, filed Aug. 7, 2008, and, which application is based on and claims priority of Japanese patent application No. 2007-327210 filed on Dec. 19, 2007, the entire contents of which are hereby incorporated by reference.

BACKGROUND OF THE INVENTION

1. Field of the Invention

The present invention relates to a probe control and measurement data correction technique which addresses adhesion of a probe to a side wall of a measured pattern in measurements using a scanning probe microscope.

2. Description of the Related Art

Scanning probe microscopes (SPM) are known as one of the techniques for measuring a microscopic 3D shape. In this technique, a sharp-pointed probe is brought into proximity to or contact with the surface of a sample, and the measured amount of physical interaction such as an atomic force or the like being generated between the probe and the sample at this time is displayed as an image. An atomic force microscope (AFM), which is one of the SPM, is a technique in which an atomic force acting between a probe attached to the end of a beam supported at only one end (leaf spring) called a cantilever and a sample, namely, a contact force between the probe and the sample is detected by the amount of flexure of the cantilever, and the sample surface is scanned while performing control such that the amount of flexure is kept constant, to measure a microscopic shape on the sample surface. The AFM is widely used in various fields such as biology, physics, semiconductors, storages or the like as the technique allowing to measure a microscopic 3D shape in an atomic order.

Especially in the fields of semiconductors and storages, patterns have been increasingly reduced in size every year, and thus, there is a growing expectation for the AFM as the technique allowing to measure a microscopic 3D shape in an atomic order.

Some methods are generally known as the AFM measuring method, and the methods are selectively used depending on a measurement purpose. For example, contact mode, which is most common, is a method of performing scanning with a probe continuously contacting a sample, and is mainly suitable for measuring a flat sample.

On the other hand, in order to measure a pattern having a high aspect ratio, the following measuring methods suitable for the high aspect pattern are used. One of the methods is a method called cyclic contact mode, in which a probe is vibrated at a vibration frequency near a resonance point, and scanning is performed while performing control such that the vibration amplitude (setpoint) of the probe at the time when the probe contacts a sample is kept constant. In this method, damages to a soft and brittle sample and the probe are reduced since the probe intermittently contacts the sample during probe scanning and the probe does not continuously drag along the sample as in the contact measurement.

Also, a method disclosed in Japanese Patent Publication No. 3925380 (Patent Document 1) can be cited as an effective measuring method in measuring the high aspect pattern. This method is a method of performing a measurement by completely pulling a probe away from a sample 101, moving the probe to a next measuring point, and then, bringing the probe closer to the sample again during probe scanning. Both of the above measuring methods are featured by bringing the probe into intermittent contact with the sample.

In the case of the cyclic contact mode method, the measurement is performed with the probe dynamically contacting the sample, unlike the method disclosed in Patent Document 1 in which the measurement is performed with the probe statically contacting the sample. Moreover, Japanese Patent Laid-Open Publication No. 2004-132823 (Patent Document 2) discloses a measuring method in which a method disclosed in Japanese Patent Laid-Open Publication No. 11-352135 (Patent Document 3) and the probe operation disclosed in Patent Document 1 are combined (a method of performing a measurement by repeating retraction from and approach to a sample with a probe being vibrated).

Also, Japanese Patent Laid-Open Publication No. 2006-329973 (Patent Document 4) discloses a method of controlling all the time a retraction position of a probe at a minimum required distance to be released from adhesion and temporarily increasing the retraction distance when a bump is detected, and also, an example in which a carbon nano tube is bent by an electrostatic force to accurately measure the bump. Japanese Patent Laid-Open Publication No. 07-270434 (Patent Document 5) discloses that a probe capable of vibrating in a horizontal direction is brought into contact with a side wall by successive taps such that the probe is not affected by adhesion when the probe contacts the side wall of a groove in an integrated circuit. Also, a method of removing a measurement error resulting from a probe shape is described in J. S. Villarrubia, "Algorithms for Scanned Probe Microscope Image Simulation, Surface Reconstruction and Tip Estimation", Journal of Research of the National Institute of Standards and Technology, Volume 102, Number 4, July-August 1997 (Non-Patent Document 1), and David Keller, "Reconstruction of STM and AFM images distorted by finite-size tips", Surface Science, 253 (1991) 353-364 (Non-Patent Document 2).

Among the fields in which the AFM is increasingly used, circuit patterns have been increasingly reduced in size along with circuit integration in the field of semiconductors, and recording patterns have been increasingly reduced in size as recording densities have been increased in capacity in the field of optical disks and magnetic disks (patterned media). It is desirable that patterns are evaluated in a development process and the results are fed back to the development process to thereby improve the efficiency of development. The size reduction of the measured patterns (semiconductor circuit patterns, optical disk pits, bit arrays of patterned media) reaches the order of several tens of nm. Thus, when these patterns are measured by the AFM, a technique for handling an elongated probe used for the pattern having a high aspect ratio becomes important.

As a typical elongated probe, there are an Si probe whose tip is sharp-pointed for the pattern having a high aspect ratio, a carbon nano tube (CNT) probe as a carbon probe, a high density carbon (HDC) probe or the like. Among the above probes, the Si probe and the HDC probe have a tip diameter of about a few nm at the smallest, but have a tapered shape, and the aspect ratio is 10 or more at the largest. On the other hand, the CNT probe used in the AFM has a probe diameter of 10 nm or more, but has a columnar shape, and the aspect ratio is higher. Accordingly, the CNT probe is very useful for measuring a microscopic pattern having a high aspect ratio.

However, in the case where a pattern having a steep side wall is measured using the elongated probe, there occurs a problem that, when the probe approaches the side wall of the pattern, the probe is attracted and adheres to the side wall due to the van der Waals forces acting between the probe and the side wall. An error occurs in the measured profile of the side wall portion due to torsion of a cantilever and deflection of probe caused by the adhesion. Furthermore, in the case where a pattern having a groove width almost equal to the diameter of a probe is measured, the probe adheres to both side walls and the probe cannot reach the groove bottom. Thus, the groove depth cannot be measured. Also, if a measurement contact force is set to be large such that the probe reaches the groove bottom, there occurs a new problem that damages to the probe and the sample are increased and a profile error increases due to slipping of the probe occurring in the steep side wall portion of the pattern.

SUMMARY OF THE INVENTION

A scanning probe microscope according to the present invention is a scanning probe microscope for scanning a sample surface with a probe formed on a cantilever and detecting an interaction acting between the probe and the sample surface to measure a physical property including a surface shape of the sample, comprising means for detecting adhesion of the probe to a side wall of a measured pattern, wherein a control state of the probe is changed when the adhesion is detected.

Also, a scanning probe microscope according to the present invention is a scanning probe microscope for scanning a sample surface with a probe formed on a cantilever and detecting an interaction acting between the probe and the sample surface to measure a physical property including a surface shape of the sample, comprising means for detecting a side wall portion of a measured pattern, wherein a control state of the probe is changed when the probe reaches the side wall portion of a measured pattern.

Also, a scanning probe microscope according to the present invention is a scanning probe microscope for scanning a sample surface with a probe formed on a cantilever and detecting an interaction acting between the probe and the sample surface to measure a physical property including a surface shape of the sample, comprising means for detecting torsion of the cantilever, wherein a profile error caused by deflection of probe and torsion of the cantilever is corrected.

According to the present invention, a microscopic pattern shape having a high aspect ratio can be measured, and by using the present invention for research and development in the fields of semiconductors and storages in which patterns will be further reduced in size in the future, the efficiency of research and development can be improved. Also, by applying the present technique to mass production management in the fields, the product yield can be improved.

BRIEF DESCRIPTION OF THE DRAWINGS

FIG. 22 is an explanatory view illustrating a method of obtaining torsion sensitivity of a cantilever;

DETAILED DESCRIPTION OF THE PREFERRED EMBODIMENTS

In the following, embodiments of the present invention will be described with reference to the drawings.

Embodiment 1

Figure 1:
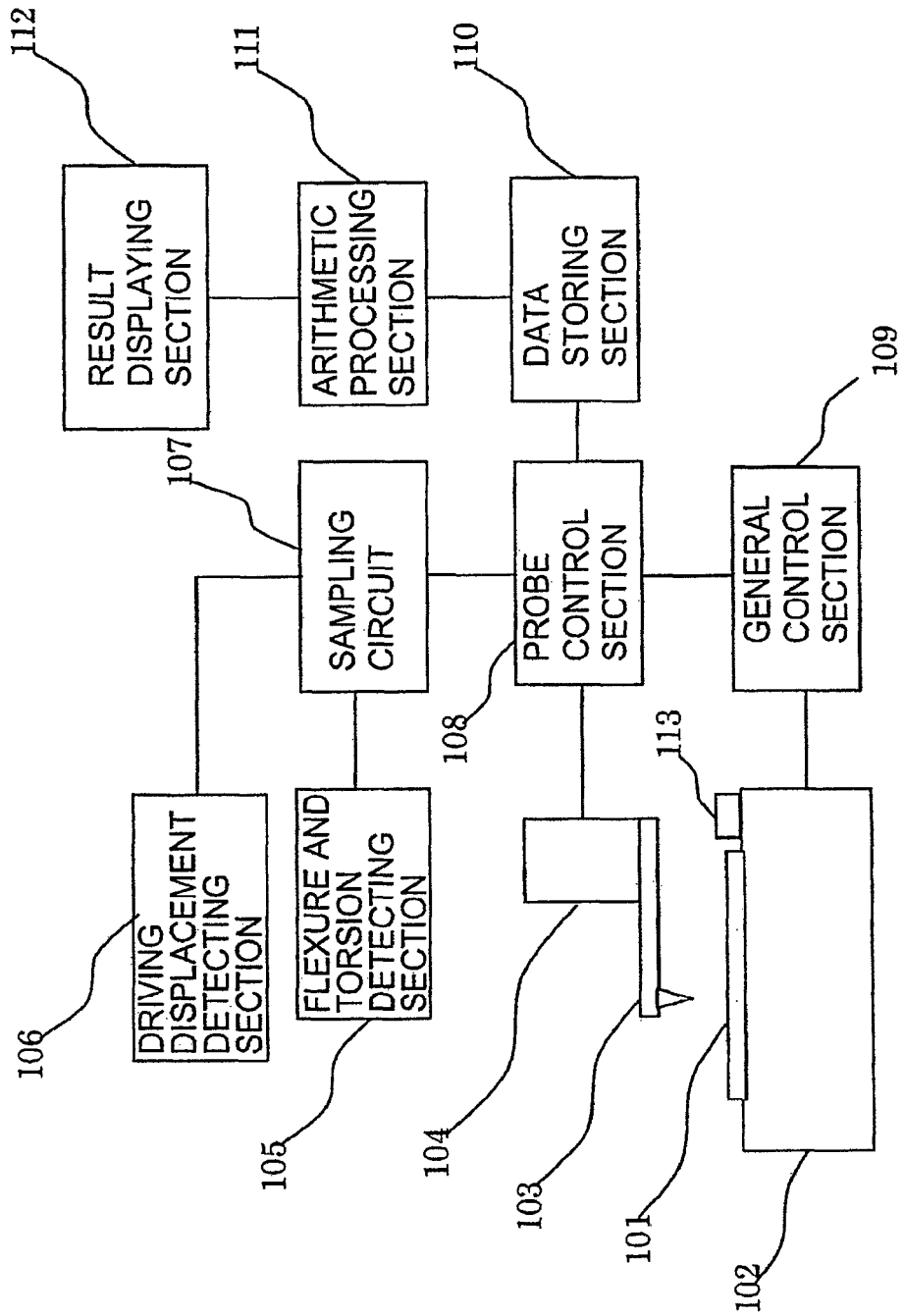
FIG. 1 is an explanatory view illustrating an apparatus configuration of a scanning probe microscope according to an embodiment 1 of the present invention.

A method of measuring the depth of a groove pattern using an elongated probe in a step-in (registered trademark) measuring method disclosed in Patent Document 1 will be described below. First, a configuration example of a scanning probe microscope according to the present invention will be described with reference to FIG. 1.

Figure 26:
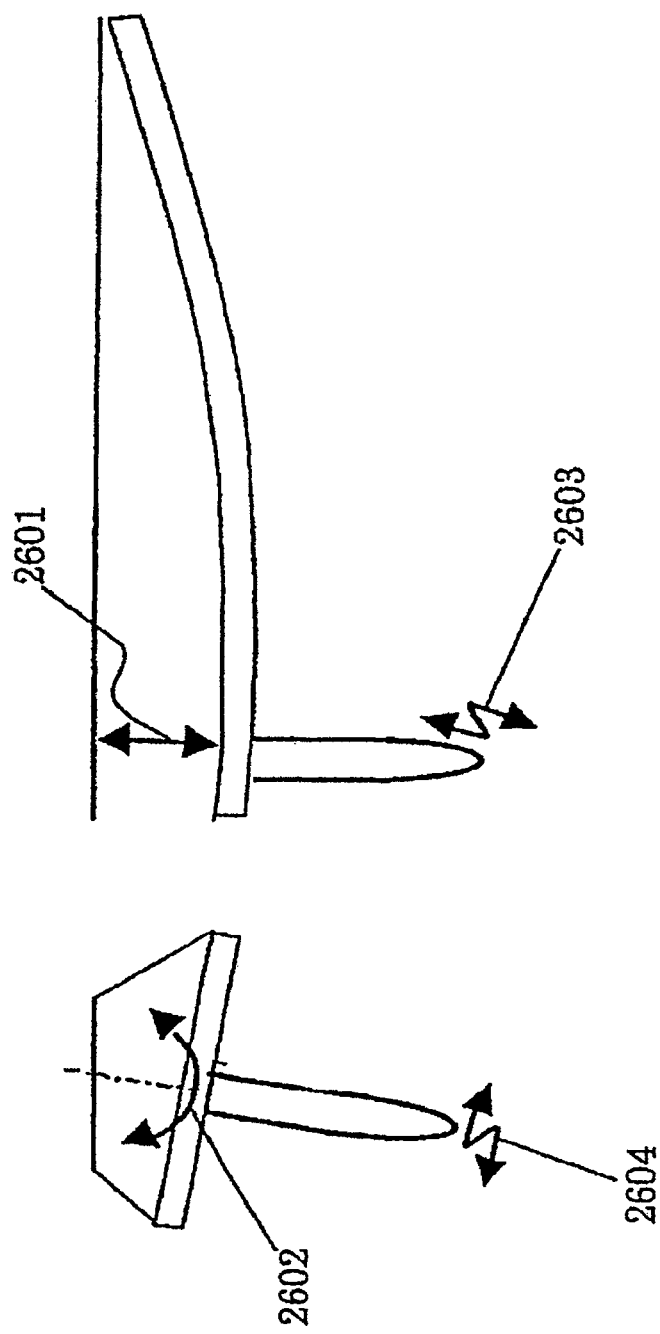
FIG. 26 is an explanatory view illustrating deformations and a vibration state of a cantilever.

An apparatus is constituted by a coarse-movement stage 102 capable of moving with a measurement sample 101 placed thereon, a measurement probe 103 having a probe tip on a cantilever for scanning the sample, an XYZ scanning drive section 104 for driving the probe in XYZ directions, a flexure and torsion detecting section 105 for detecting flexure 2601 and torsion 2602 as shown in FIG. 26 which are static deformations of the cantilever, a driving displacement detecting section 106 for detecting the driving displacement of each XYZ axis, a sampling circuit 107 for sampling each sensor signal detected, a probe control section 108 for giving an instruction to the XYZ scanning drive section 104, a general control section 109 for controlling the coarse-movement stage, measurement sequences or the like, a data storing section 110 for recording data, an arithmetic processing section 111 for performing arithmetic processing or the like, a result displaying section 112 for displaying a processing result in the arithmetic processing section, and a sample 113 used in torsion sensitivity calibration of the measurement probe 103. A piezoelectric element capable of controlling the amount of deformation by an applied voltage, and also, other drive elements such as a voice coil motor or the like may be used as the XYZ scanning drive section 104. Also, optical lever detection or the like generally composed of a laser and a quadrant photo detector is used in the flexure and torsion detecting section 105. In the optical lever detection, the amount of flexure 2601 and the amount of torsion 2602 of the cantilever as shown in FIG. 26 can be detected as a change in laser spot position on the photo detector. Although the example in which the XYZ scanning drive section 104 is arranged on the probe side is shown, arranging the XYZ scanning drive section 104 in the sample side instead of the coarse-movement stage causes no problems in carrying out the present invention.

At the time of measurement, the probe is brought into proximity to or contact with the sample surface, and while the relative positions of the probe and the sample are scanned by the coarse-movement stage 102 or the XYZ scanning drive section 104, a physical interaction such as an atomic force or the like occurring at this time is measured by a sensor of the flexure and torsion detecting section 105. An output signal from each sensor is obtained at a given timing by the sampling circuit 107. The probe control section 108 outputs a drive signal to the XYZ scanning drive section 104 based on the output of the flexure and torsion detecting section 105 and the driving displacement detecting section 106 to control approach and retraction of the probe to and from the sample 101. When the probe reaches each measurement position, each sensor signal is recorded in the data storing section 110 by a trigger signal from the probe control section 108, and is displayed as a numeric value or an image in the result displaying section 112 through the processing in the arithmetic processing section 111. Also, at the time of measuring the surface shape of the sample, an electrostatic capacitance or resistance can be measured by applying a voltage between the probe and the sample in addition to mechanical properties of the sample surface.

In the following, a method of measuring a microscopic concave-convex pattern using the elongated probe will be described. In the present invention, when the probe adheres to a side wall of the pattern, the adhesion of the probe to the side wall is detected. A contact force between the probe and the sample is increased only when the adhesion is detected to cause the probe to reach the bottom of a concave portion of the pattern. First, a method of detecting the adhesion of the probe to the side wall will be described.

Figure 2:
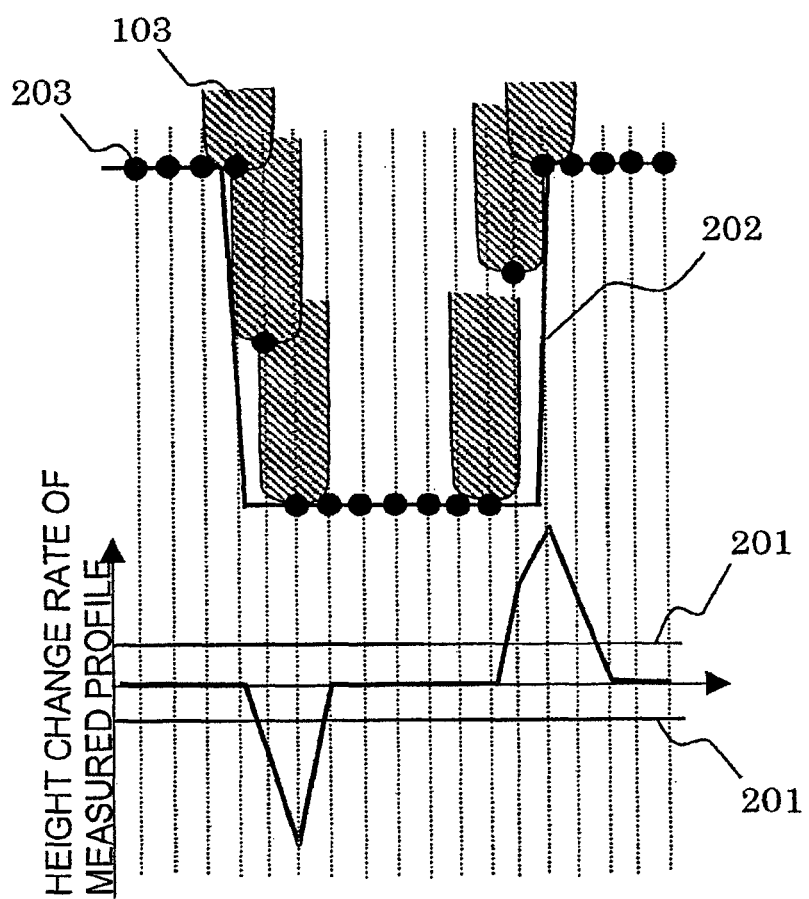
FIG. 2 is an explanatory view illustrating the height change rate of a measured profile at the time of measuring a pattern having a high aspect ratio.

Since the adhesion of the probe to the side wall is a phenomenon in which torsion occurs in the cantilever in the side wall portion, the adhesion can be detected from the torsion of the cantilever occurring in the side wall portion. When the side wall portion of the pattern is measured by the probe, the height change rate of the measured profile sharply increases in comparison with a flat portion. Accordingly, the measured profile can be identified as the side wall portion according to the height change rate of the measured profile. The height change rate of the measured profile can be acquired by obtaining a difference in height data between respective measuring points (203) as shown in FIG. 2. By providing a threshold 201 in the change rate, the measured profile is determined to be the side wall portion when the change rate reaches the threshold or more.

Figure 3:
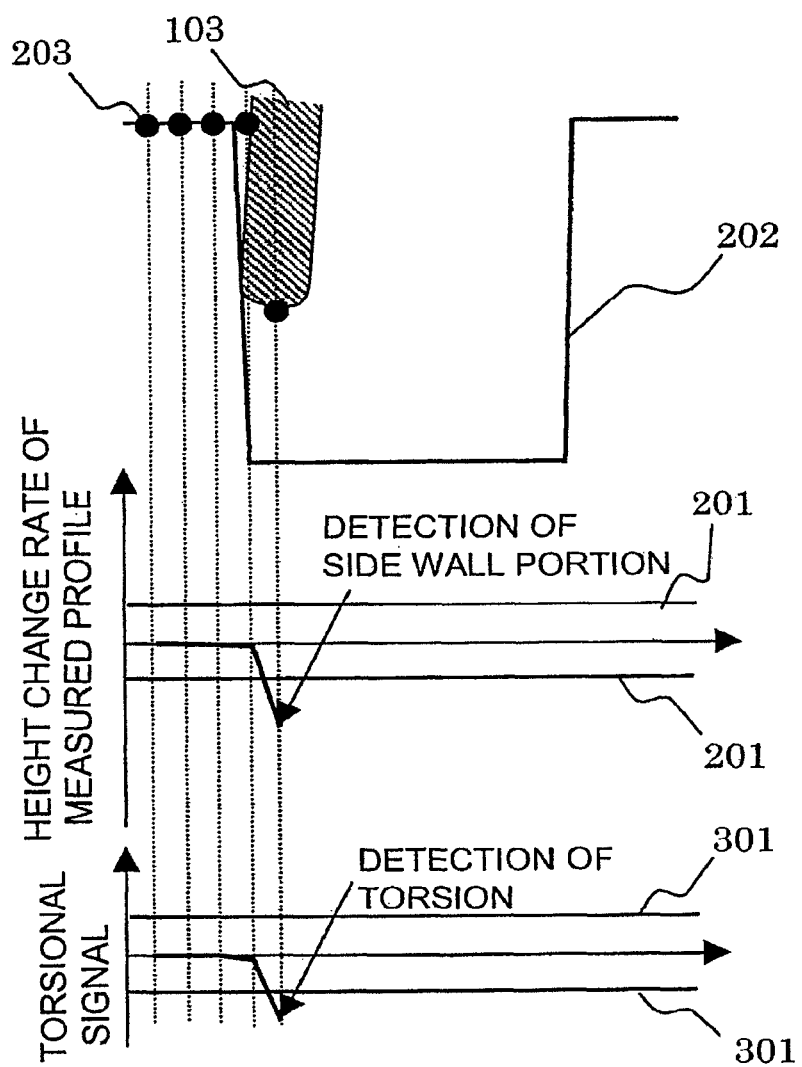
FIG. 3 is an explanatory view illustrating the height change rate of a measured profile and torsion of a cantilever at the time when a probe adheres to a side wall.

Furthermore, when the torsion of the cantilever is detected in a measurement position where the height change rate increases as shown in FIG. 3, the adhesion to the side wall portion can be determined to occur. The torsion of the cantilever can be detected by the flexure and torsion detecting section 105. A threshold 301 is provided in the amount of change in torsional signal of the flexure and torsion detecting section 105 to determine that the torsion of the cantilever is occurring when the detected amount of signal change reaches the threshold 301 or more. That is, when the change rate of the measured profile reaches the threshold 201 or more and the change in torsional signal reaches the threshold 301 or more, the adhesion of the probe to the side wall is determined to occur. Next, a method of detecting the adhesion of the probe to the side wall when both slipping and adhesion of the probe occur in the side wall portion will be described. The torsion of the cantilever is a phenomenon which also occurs when the slipping of the probe occurs in the pattern side wall portion as well as when the probe adheres to the pattern side wall.

Figure 4:
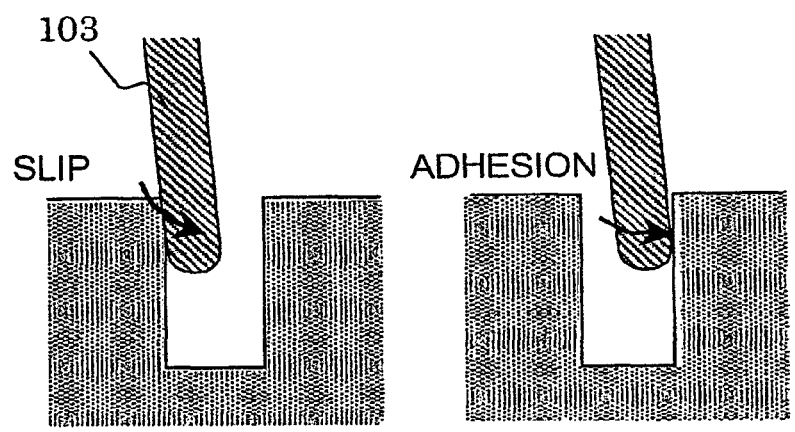
FIG. 4 is an explanatory view illustrating slipping and adhesion of a probe in a side wall portion.

For example, torsion in the same direction occurs in the cantilever in the case where the probe slips on a left side wall portion and where the probe adheres to a right side wall portion as shown in FIG. 4. This applies to the case where the probe slips on the right side wall portion and where the probe adheres to the left side wall portion, too. The slipping of the probe on the side wall portion is a phenomenon occurring when the contact force between the probe and the sample is high, and thus, if the contact force is increased in the state, a profile error of the side wall portion increases. Therefore, it is desirable to increase the contact force only when the probe adheres to the side wall. The cause (slipping, adhesion) of the torsion of the cantilever occurring in the respective right and left side walls can be identified by the direction of torsion if it is possible to detect whether the torsion of the cantilever occurs in the right side wall or the left side wall. Therefore, the adhesion of the probe to the side wall is detected by using the direction of height change of the measured profile and the direction of torsion of the cantilever.

Figure 5:
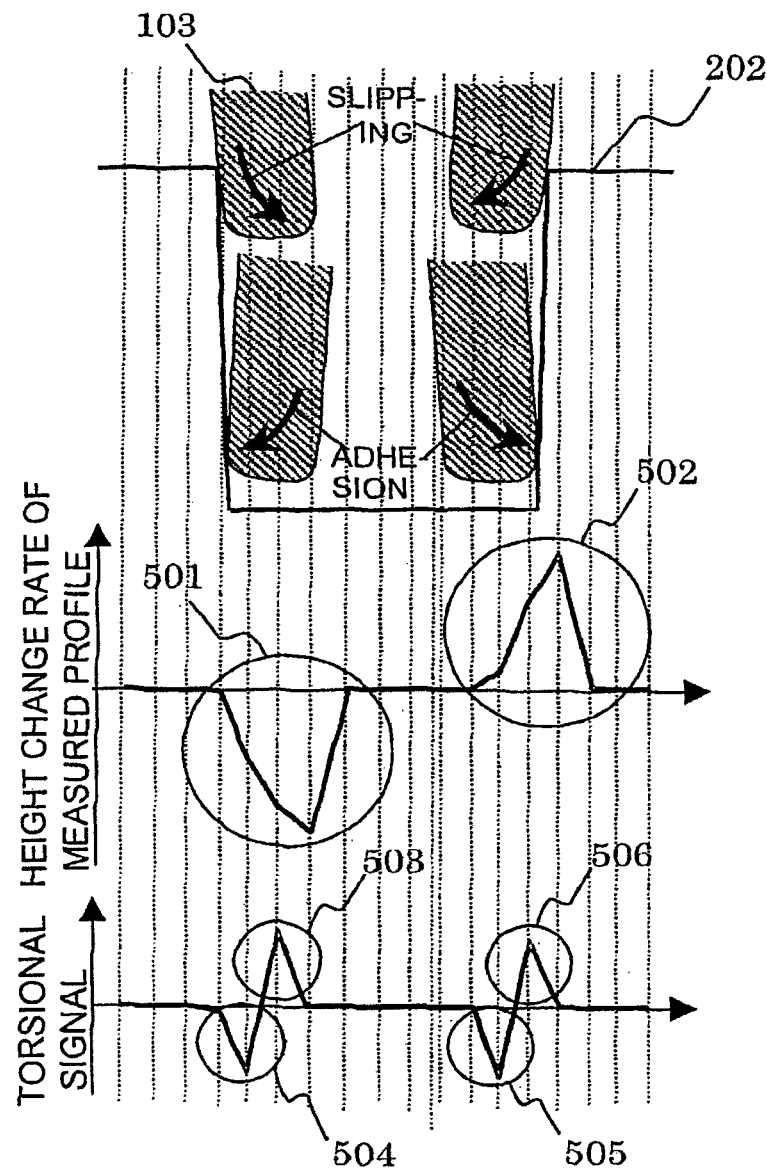
FIG. 5 is an explanatory view illustrating the height change rate of a measured profile and torsion of a cantilever caused by slipping and adhesion of a probe occurring in a side wall portion at the time of measuring a pattern having a high aspect ratio.

As shown in FIG. 5, the direction of height change of the measured profile is negative (501) in the left side wall portion, and is positive (502) in the right side wall portion. Accordingly, the right side wall and the left side wall can be discriminated from the direction of height change of the measured profile. Also, the slipping and the adhesion of the probe in the respective right and left side walls are opposite in the direction of torsion of the cantilever, and the torsional signals thereof are also changed in the opposite direction.

That is, as shown in FIG. 5, a change 503 in the torsional signal when the probe slips on the left side wall portion is positive and a change 504 in the torsional signal when the probe adheres to the left side wall portion is negative, which are opposite to each other. Similarly, a change 505 in the torsional signal when the probe slips on the right side wall portion and a change 506 in the torsional signal when the probe adheres to the right side wall portion are also opposite to each other. Therefore, by analyzing the sign of the height change rate of the measured profile and the direction of torsion of the cantilever in the case where the height change rate of the measured profile reaches the threshold or more and the change in the torsional signal reaches the threshold or more, only the torsion of the cantilever caused by the adhesion to the side wall can be detected.

Figure 6:
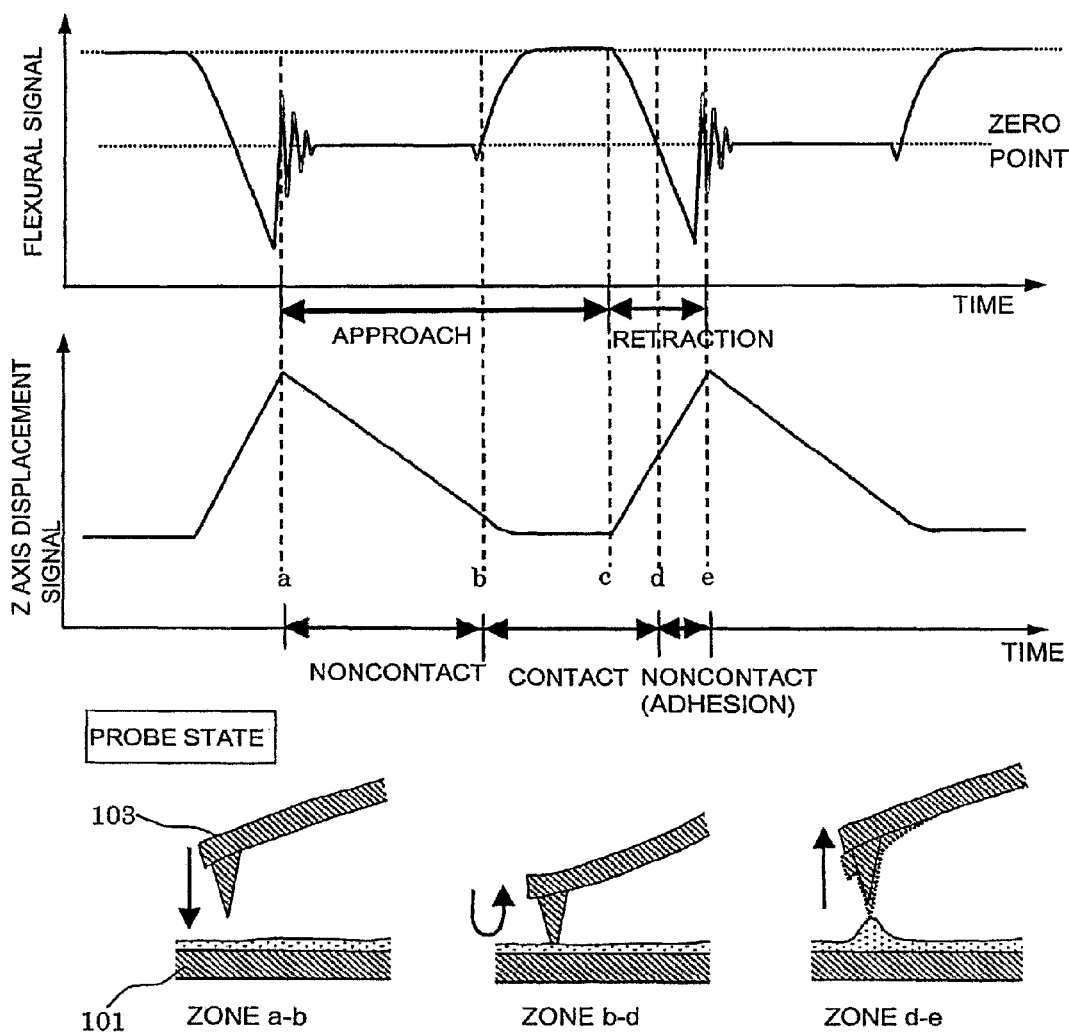
FIG. 6 is an explanatory view illustrating a probe operation and a change in flexural signal at the time of measurement.

Also, as another method of detecting the adhesion of the probe to the side wall, a method of using a flexural signal and a torsional signal of the cantilever which can be detected by the flexure and torsion detecting section 105 will be described. First, a probe operation and a change in the flexural signal at the time of measurement will be described with reference to FIG. 6. The flexural signal is changed when the probe receives a force from the sample. Thus, in the state in which the probe is sufficiently away from the sample (no force acts on the probe), the flexural signal has a constant value (zero point) and is not changed.

When the probe is approached to the sample from the state in which the probe is completely away from the sample, the probe is attracted upon reception of an attractive force from the sample surface immediately before the probe is brought into contact with the sample, and the probe contacts the sample (zone a-b). When the probe contacts the sample, the flexural signal is changed in proportion to the contact force between the probe and the sample. The probe continues to be lowered until the amount by which the probe is pushed into the sample reaches a given value (given contact force) (zone b-c). After the amount by which the probe is pushed into the sample reaches a given value, the retraction of the probe is started. The force acting on the probe is gradually reduced (zone c-d).

When the amount by which the probe is pushed into the sample disappears, no force acts on the probe (d point). After that, the state in which the probe adheres to the sample surface is generated. At this time, the probe receives a force in the opposite direction from that of the contact state with the sample. Thus, the flexure of the probe is opposite to that at the time of contacting, and the flexural signal is changed in the opposite direction from that of the contact state. By further continuing the retraction, the probe is released from the adhesion state (zone d-e). After the retraction of the probe is finished, the probe starts to approach the sample again and the series of operations is repeatedly performed in each measuring point.

Figure 7:
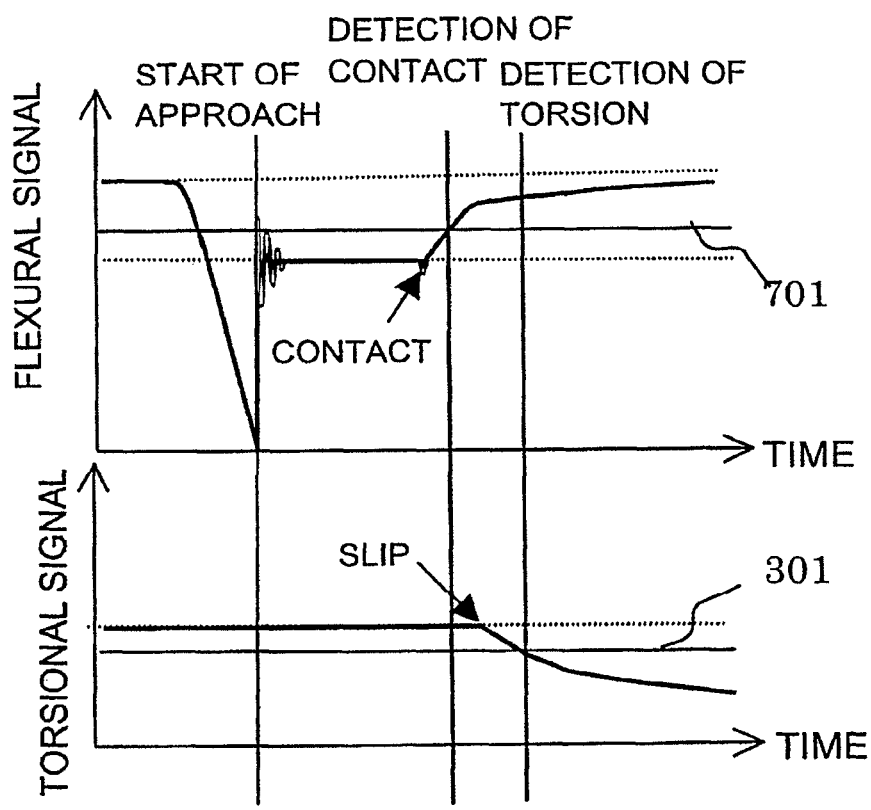
FIG. 7 is an explanatory view illustrating the amount of flexure and the amount of torsion of a cantilever when a probe slips on a side wall portion.
Figure 8:
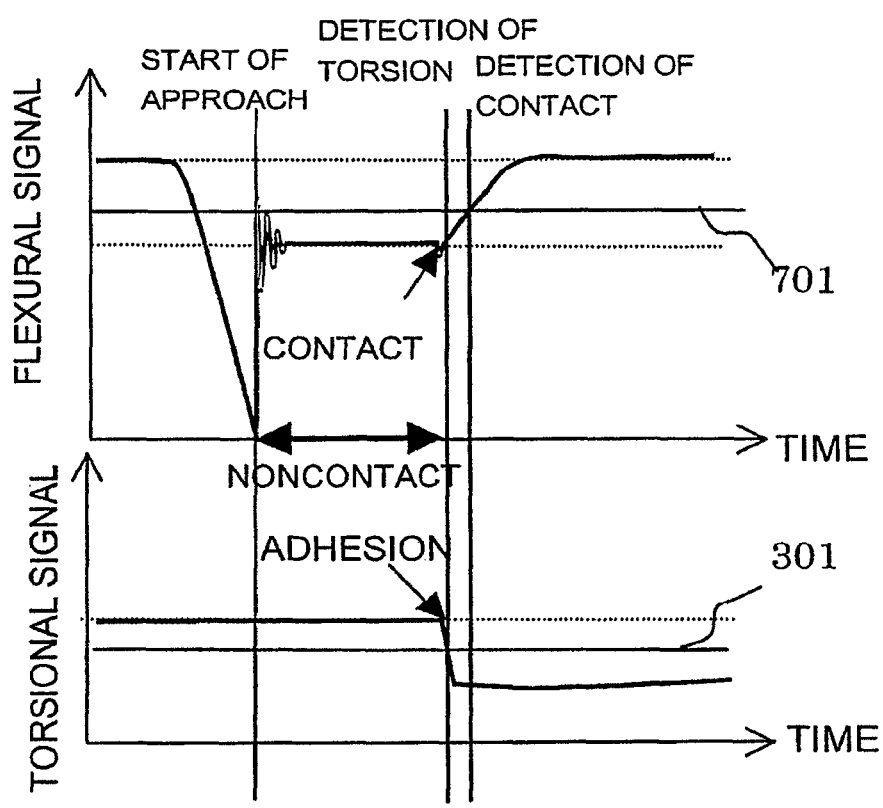
FIG. 8 is an explanatory view illustrating the amount of flexure and the amount of torsion of a cantilever when a probe adheres to a side wall portion.

Next, a method of detecting the adhesion to the side wall by using the flexural signal and the torsional signal will be described with reference to FIG. 7 and FIG. 8. FIG. 7 illustrates changes in the flexure and the torsional signal when the probe slips on the side wall, and FIG. 8 illustrates changes in the flexural signal and the torsional signal when the probe adheres to the side wall. In the case where the probe slips on the side wall, the torsion of the cantilever caused by the slipping of the probe occurs after the probe contacts the sample. Therefore, as shown in FIG. 7, the torsional signal is changed after the flexural signal is changed from the zero point. On the other hand, in the case where the probe adheres to the side wall, the probe contacts the sample after the torsion of the cantilever caused by the adhesion of the probe occurs. Therefore, as shown in FIG. 8, the flexural signal is changed after the torsional signal is changed. Accordingly, by analyzing the flexural signal and the torsional signal before and after the probe contacts the sample, the flexure of the probe to the side wall can be detected from the order of the signal changes.

To be more specific, a contact detection threshold 701 of a low contact force by which the slipping of the probe does not occur is set with respect to the flexural signal, and by determining whether the torsional signal exceeds a torsion determining threshold 301 at the time of detecting a contact (at the moment when the defection signal exceeds the threshold), the adhesion can be detected. That is, it is possible to determine that the torsion caused by the adhesion is occurring in the case where the torsional signal exceeds the threshold 301 at the time of detecting a contact, and that the torsion is not occurring in the case where the torsional signal does not exceed the threshold. According to the method, only the torsion of the cantilever caused by the adhesion can be selectively detected. Furthermore, by combining this method with the respective methods of detecting the adhesion described above, the adhesion can be more reliably detected.

Figure 9:
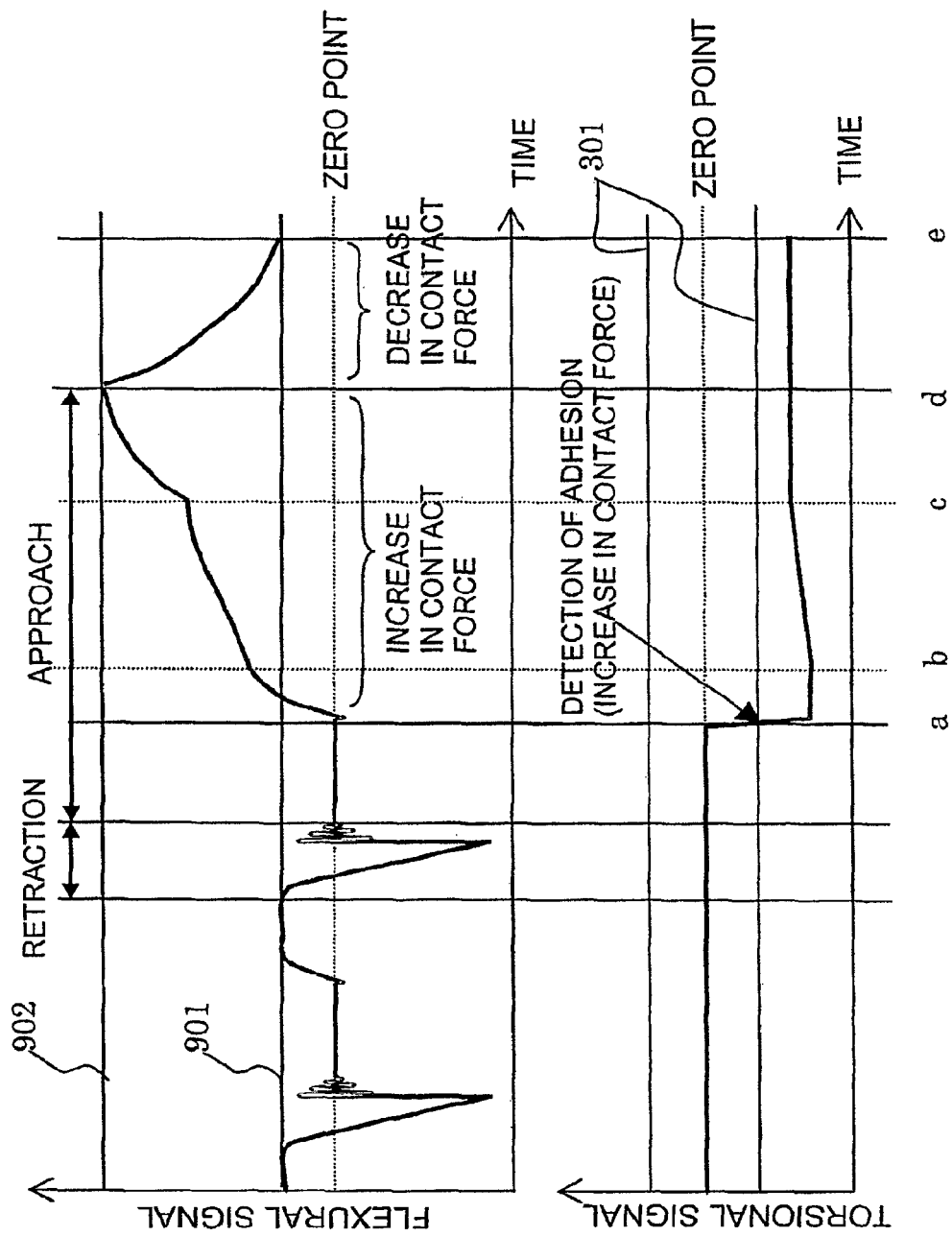
FIG. 9 is an explanatory view illustrating a method of increasing and decreasing a contact force between a probe and a side wall after adhesion to a side wall is detected.
Figure 10:
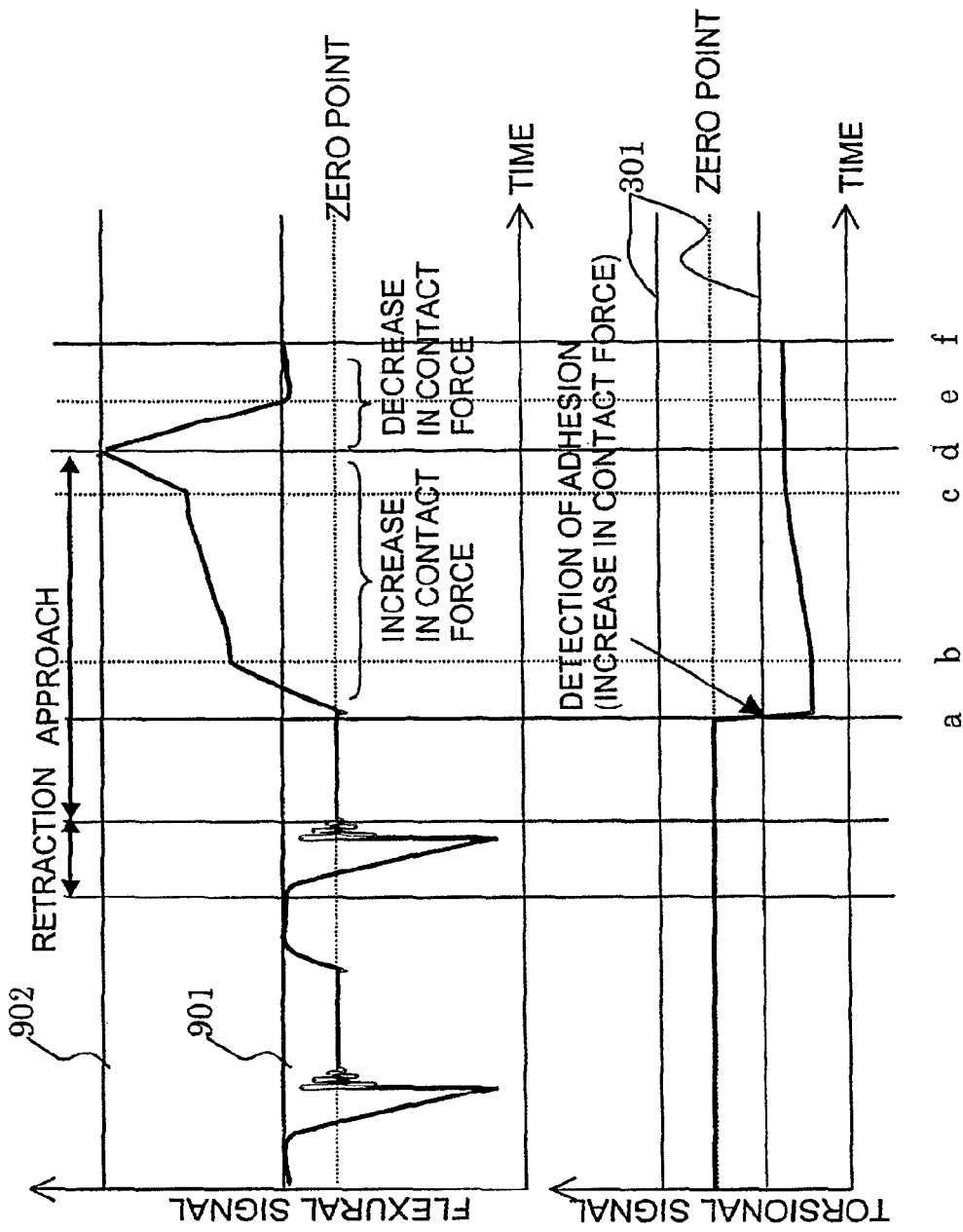
FIG. 10 is an explanatory view illustrating a method of increasing and decreasing a contact force between a probe and a side wall after adhesion to a side wall is detected.

When the adhesion of the probe to the side wall is detected by the above method, the contact force between the probe and the sample is increased to cause the probe to reach the side wall bottom portion. This method will be described with reference to FIG. 9 and FIG. 10. FIG. 9 and FIG. 10 illustrate the flexural signal and the torsional signal at the time of measurement. As shown in FIG. 9, after the probe contacts the sample, the probe is lowered onto the sample until the contact force between the probe and the sample reaches a contact force target value 901 for obtaining measurement data. Two types of target values, the contact force target value 901 for obtaining data and a contact force target value 902 (contact force larger than 901) for increasing the contact force, are provided as the contact force target value. By performing force servocontrol by setting the target value to 902, or by lowering the probe onto the sample at a constant speed until the contact force reaches 902, the contact force can be increased. In the case where the contact force is increased by the force servocontrol as in the former case, the increasing rate of the contact force becomes smaller as the contact force approaches the target value. However, by using the method of the latter case, the increasing rate of the contact force is always constant (the contact force is increased at a constant rate), and it is possible to cause the contact force to reach the target contact force at a high speed.

Also, when the contact force is increased, an increase in the contact force more than necessary increases damages to the probe and the sample, and also causes an increase in measurement time due to an unnecessary probe operation. Therefore, a method of detecting the arrival of the probe at the side wall bottom portion and controlling the increase in the contact force to the minimum necessary will be described below. As shown in FIG. 10, when the contact force between the probe and the sample is increased at a constant rate, the contact force increases at a constant increasing rate (the change rate of flexure of the probe) until the probe starts to slip on the side wall portion (zone a-b). When the contact force reaches a given value, the probe starts to slip on the side wall portion, and thus, the increasing rate (the change rate of flexure of the probe) of the contact force between the probe and the sample becomes smaller (zone b-c). When the probe reaches the side wall bottom portion, the probe stops slipping, and thus, the increasing rate (the change rate of flexure of the probe) of the contact force becomes larger again to be almost equal to that before the slipping occurs (zone c-d). Accordingly, by observing the change rate of the flexural signal after changing the contact force to 902, and detecting a change point (time c) of the change rate of flexure at the time when the probe reaches the pattern bottom portion, the arrival of the probe at the pattern can be detected. However, while the probe is slipping on the side wall portion, the increasing rate of the contact force may momentarily become larger due to a shape change of the side wall surface, a local increase in frictional force between the probe and the sample or the like. Thus, there is a possibility that the determination is wrong if the change in the change rate of flexure is simply detected. Therefore, pushing of the probe into the sample may be stopped by determining that the probe reaches the side wall bottom portion when the increased change rate of the contact force lasts for a certain period of time or more after the time c.

Also, by using the above method only, the probe is caused to reach the side wall bottom portion in all the cases where the adhesion of the probe to the side wall is detected. This causes no problems in measuring the depth of a groove. However, for example, when the side wall is not vertical but has a tapered shape, it is only necessary that the probe reaches a position (b point in FIG. 11) which the probe can reach when the probe does not adhere to the side wall from a state (a point in FIG. 11) in which the probe is tilted by the adhesion. Accordingly, by starting to observe the amount of torsion of the cantilever at the same time as detecting the arrival at the side wall bottom portion, and stopping the pushing of the probe into the sample in a position where the torsion of the cantilever caused by the adhesion disappears (the amount of torsion is zero), excessive pushing of the probe into the sample can be eliminated. Practically, at the moment when the torsional signal crosses the zero point (1101) during the pushing of the probe into the sample, the pushing of the probe into the sample is stopped.

After the probe reaches the side wall bottom portion by the above method, measurement data is obtained. A method of obtaining the measurement data will be described below. In the case where the measurement data is obtained by directly using the increased contact force, a height error occurs due to a difference in the contact force with other measuring points. The height error occurring in this case is expressed by Equation (1). By correcting the measured profile by using a correction equation shown in Equation (2), the height error due to the difference in the measurement contact force can be eliminated.

$$\Delta h = \Delta F / k \quad (1)$$

($\Delta F$: the difference in the contact force before and after increasing the contact force, k: the constant of spring of the probe, $\Delta h$: the height error)

$$h = h' - \Delta h \quad (2)$$

(h: the corrected height, h': the measured height)

As another measuring method, the measurement data may be obtained after restoring the contact force to the same contact force as those of other measuring points at the time when the probe reaches the side wall bottom portion. As a method of restoring the contact force, force servocontrol may be performed by setting the target value of the force servocontrol to the contact force target value 901 again as shown in a zone d-e in FIG. 9. Also, as shown in a zone d-e in FIG. 10, the probe may be raised from the sample at a constant speed until the contact force reaches the contact force target value 901, and after the contact force returns to the vicinity of 901, force servocontrol may be performed by setting the target value to the contact force 901 as in a zone e-f. By using the latter method as in the case of increasing the contact force, the contact force can be restored to the original contact force at a constant rate higher than the case of using the force servocontrol, and the increase in measurement time caused by the change in the contact force can be reduced.

Embodiment 2

A method of measuring the depth of a groove pattern using an elongated probe in a cyclic contact mode measuring method disclosed in Patent Document 2 will be described below. First, a configuration example of a scanning probe microscope according to the present invention will be described with reference to FIG. 12. An apparatus is constituted by a coarse-movement stage 102 capable of moving with a measurement sample 101 placed thereon, a measurement probe 103 having a probe on a cantilever for scanning the sample, an XYZ scanning drive section 104 for driving the probe in XYZ directions, a flexure and torsion detecting section 105 for detecting flexure 2601 and torsion 2602 as shown in FIG. 26 which are static deformations of the cantilever, a driving displacement detecting section 106 for detecting the driving displacement of each XYZ axis, a probe vibrating section 114 for vibrating the probe, a vibration amplitude detecting section 115 for detecting the vibration amplitude of the probe, a sampling circuit 107 for sampling each sensor signal detected by the probe, a probe control section 108 for giving an instruction to the XYZ scanning drive section 104, a general control section 109 for controlling the coarse-movement stage, measurement sequences or the like, a data storing section 110 for recording data, an arithmetic processing section 111 for performing arithmetic processing or the like, a result displaying section 112 for displaying a processing result in the arithmetic processing section, and a sample 113 used in torsion sensitivity calibration of the measurement probe 103. A piezoelectric element capable of controlling the amount of deformation by an applied voltage, and also, other drive elements such as a voice coil motor or the like may be used as the XYZ scanning drive section 104. In the probe, microscopic vibrations can be generated in the probe itself or an actuator constituted by the piezoelectric element or the like disposed at the base of the probe by a signal from the probe vibrating section 114. Alternatively, the signal from the probe vibrating section 114 may be superimposed on the XYZ scanning drive section 104 and microscopic vibrations may be generated in the probe driving mechanism to thereby excite vibrations in the measurement probe 103. Also, vibrations may be excited by emitting a direct vibration exciting light to the cantilever.

Also, optical lever detection or the like generally composed of a laser and a quadrant photo detector is used in the flexure and torsion detecting section 105. In the optical lever detection, the amount of flexure 2601 and the amount of torsion 2602 of the cantilever as shown in FIG. 26 can be detected as a change in laser spot position on the photo detector. Although the example in which the XYZ scanning drive section 104 is arranged in the probe side is shown, arranging the XYZ scanning drive section 104 in the sample side instead of the coarse-movement stage causes no problems in carrying out the present invention.

At the time of measurement, the measurement probe 103 is vibrated by the probe vibrating section 114 and is brought into proximity to or contact with the sample surface. While the relative positions of the probe and the sample are scanned by the coarse-movement stage 102 or the probe drive section 104, a physical interaction such as an atomic force or the like occurring at this time is measured by a sensor of the flexure and torsion detecting section 105. An output signal from each sensor is obtained at a given timing by the sampling circuit 107. The probe control section 108 outputs a drive signal to the XYZ scanning drive section 104 based on the output of the flexure and torsion detecting section 105 and the driving displacement detecting section 106 to control approach and retraction of the probe to and from the sample 101. When the probe reaches each measurement position, each sensor signal is recorded in the data storing section 110 by a trigger signal from the probe control section 108, and is displayed as a numeric value or an image in the result displaying section 112 through the processing in the arithmetic processing section 111. At the time of measuring the surface shape of the sample, by vibrating the probe at a high frequency, the elasticity of the sample surface can be measured from a response thereof, or by applying a voltage between the probe and the sample, an electrostatic capacitance or resistance can be measured.

In the following, a method of measuring a microscopic concave-convex pattern using the elongated probe will be described. First, a method of detecting adhesion of the probe to the side wall will be described. The measuring method disclosed in Patent Document 2 is a method in which the probe vibrated in the direction of flexure by the probe vibrating section 114 is approached to or is retracted from the sample. Although the method of detecting the contact force between the probe and the sample is different from the method of Patent Document 1, the torsion of the probe when adhering to the side wall is the same as that occurring in the method of Patent Document 1. Therefore, it is possible to detect the adhesion of the probe to the side wall by using the same methods described using FIG. 2, FIG. 3 and FIG. 5 in the embodiment 1.

Next, a method of detecting the adhesion of the probe to the side wall using a flexural vibration amplitude signal and a torsional signal will be described. The contact force between the probe and the sample in the present measuring method is decided by the vibration amplitude (setpoint) of a flexural vibration 2603 of the probe as shown in FIG. 26. The contact force becomes larger as the flexural vibration amplitude decays by the approach of the probe to the sample. The flexural vibration amplitude can be detected by the vibration amplitude detecting section 115, and as to the torsion of the cantilever, the same signal as that in the embodiment 1 can be detected by the flexure and torsion detecting section 105.

Figure 13:
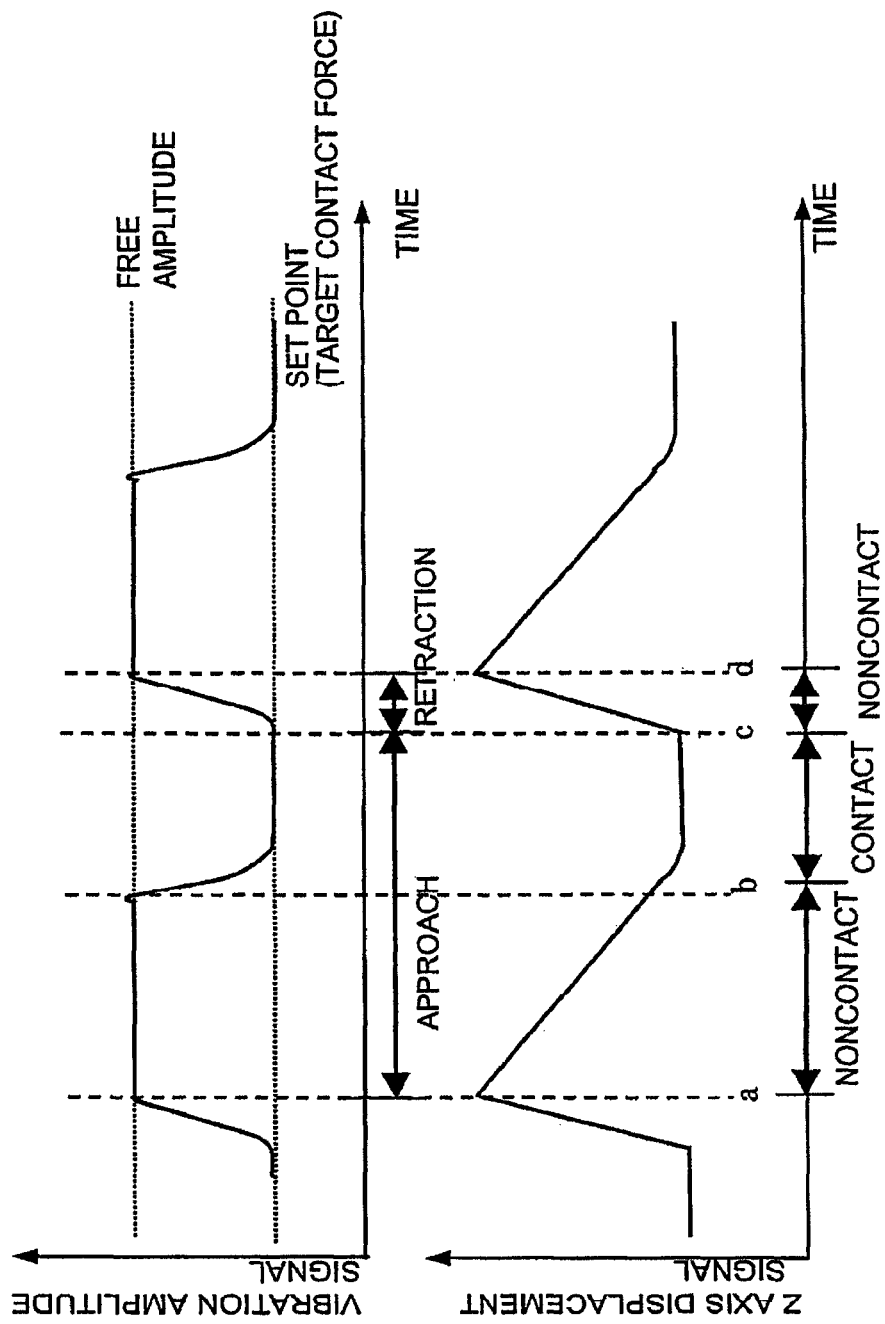
FIG. 13 is an explanatory view illustrating a probe operation and a change in flexural vibration amplitude signal at the time of measurement.

Here, a probe operation and a change in the flexural vibration amplitude detected by the vibration amplitude detecting section 115 at the time of measurement will be described with reference to FIG. 13. Since the probe is changed upon reception of a force from the sample, the flexural vibration amplitude has an almost constant value (free vibration amplitude) and is not changed in the state in which the probe is sufficiently away from the sample (no force acts on the probe). When the probe is approached to the sample from the state in which the probe is completely away from the sample, the probe contacts the sample surface (zone a-b).

The probe receives the force from the sample surface, the flexural vibration amplitude decays in proportion to the contact force between the probe and the sample, and the probe continues to be lowered until the amount by which the probe is pushed into the sample reaches a given value (contact force target value) (zone b-c). After the amount by which the probe is pushed into the sample reaches a given value, the retraction of the probe is started. The force acting on the probe is gradually decreased, and the flexural vibration amplitude is increased (zone c-d). By further continuing the retraction, the flexural vibration amplitude has a constant value (free vibration amplitude). After the retraction of the probe is finished, the probe starts to approach the sample again, and the series of operations is repeatedly performed in each measuring point.

Figure 14:
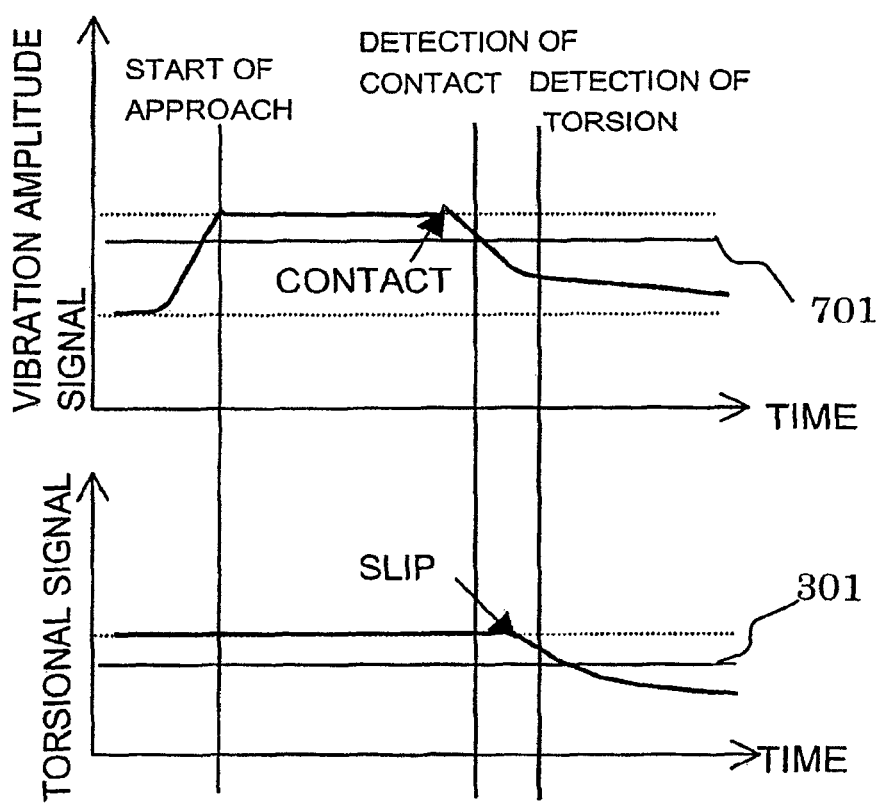
FIG. 14 is an explanatory view illustrating the flexural vibration amplitude of a probe and the amount of torsion of a cantilever when a probe slips on a side wall portion.
Figure 15:
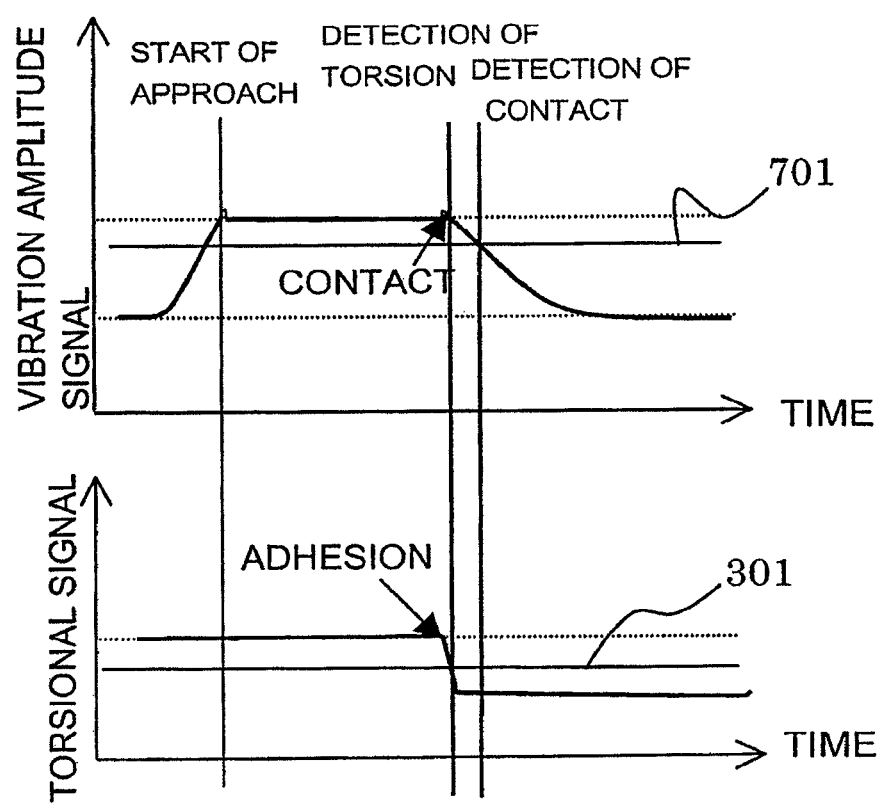
FIG. 15 is an explanatory view illustrating the flexural vibration amplitude of a probe and the amount of torsion of a cantilever when a probe adheres to a side wall portion.

FIG. 14 illustrates changes in the vibration amplitude signal of the flexural vibration and the torsional signal when the probe slips on the side wall, and FIG. 15 illustrates changes in the vibration amplitude signal of the flexural vibration and the torsional signal when the probe adheres to the side wall. As described in the embodiment 1, in the case where the probe slips on the side wall, the torsion of the cantilever caused by the slipping of the probe occurs after the probe contacts the sample. Therefore, as shown in FIG. 14, the torsional signal is changed after the vibration amplitude of the flexural vibration is changed from the free amplitude. On the other hand, in the case where the probe adheres to the side wall, the probe contacts the sample after the torsion of the cantilever caused by the adhesion of the probe occurs. Therefore, as shown in FIG. 15, the vibration amplitude of the flexural vibration is changed after the torsional signal is changed. Accordingly, by analyzing the flexural vibration amplitude signal and the torsional signal while the probe is approaching the sample, the adhesion of the probe to the side wall can be detected from the order of the signal changes.

To be more specific, a contact detection threshold 701 of a low contact force by which the slipping of the probe does not occur is set with respect to the flexural vibration amplitude signal, and by determining whether the torsional signal exceeds a torsion determining threshold 301 at the time of detecting a contact (at the moment when the flexural vibration amplitude signal exceeds the threshold), the adhesion can be detected. That is, it is possible to determine that the torsion caused by the adhesion is occurring when the torsional signal exceeds the threshold 301 at the time of detecting a contact, and that the torsion is not occurring when the torsional signal does not exceed the threshold. According to the method, only the torsion of the cantilever caused by the adhesion can be selectively detected. Furthermore, by combining this method with the respective methods of detecting the adhesion of the probe described above, the adhesion of the probe can be more reliably detected.

Figure 16:
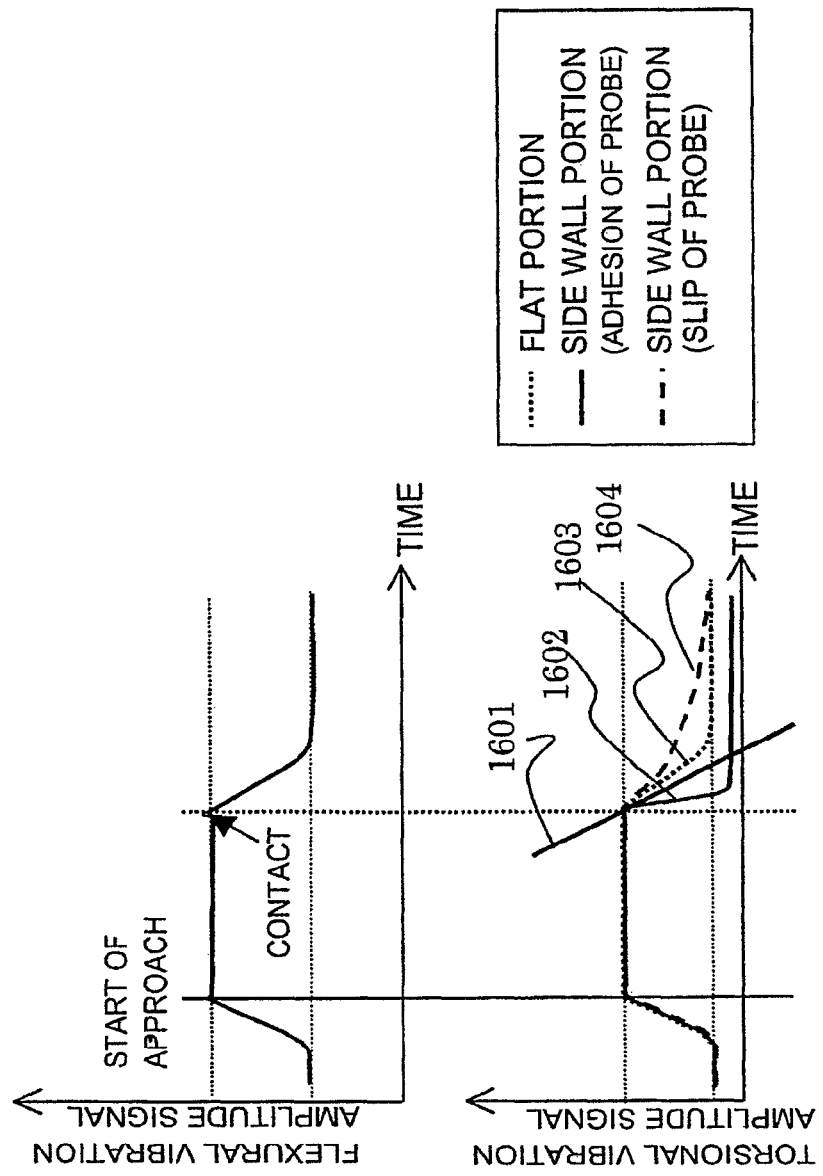
FIG. 16 is an explanatory view illustrating the flexural vibration amplitude and the torsion vibration amplitude of a probe in a flat portion and a side wall portion of a measurement sample.

Also, although the method of using the torsion of the cantilever is described above as the method of detecting the adhesion of the probe to the side wall, a method of vibrating the probe in the direction of flexure and the direction of torsion by the probe vibrating section 114 and detecting the adhesion by the amplitude of a torsion vibration 2604 of the probe as shown in FIG. 26 will be described with reference to FIG. 16. FIG. 16 illustrates the amplitude of the flexural vibration and the amplitude of the torsion vibration accompanying the retraction and approach operations of the probe. The torsion vibration as well as the flexural vibration is affected when the probe is approached to the sample surface. Therefore, the torsion vibration amplitude is also changed (1603) along with the approach operation of the probe when the probe is approached to a flat portion of the sample. However, when the probe adheres to the side wall portion, the torsion vibration is affected more strongly than the flexural vibration, and thus, is sharply changed in comparison with the flexural signal (1602). Also, when the probe slips on the side wall portion, the change rate of the torsion vibration becomes smaller than the change at the flat portion (1604). Therefore, a threshold 1601 is provided in the change rate of the torsion vibration when the probe is brought closer (the change rate of the torsion vibration amplitude 1603 at the time of bringing the probe closer to the flat portion of the sample is set as the standard for the change rate), and it is determined that the adhesion of the probe to the side wall is occurring in the case where the absolute value of the change rate of the torsion vibration when the probe is brought closer exceeds the threshold.

Figure 17:
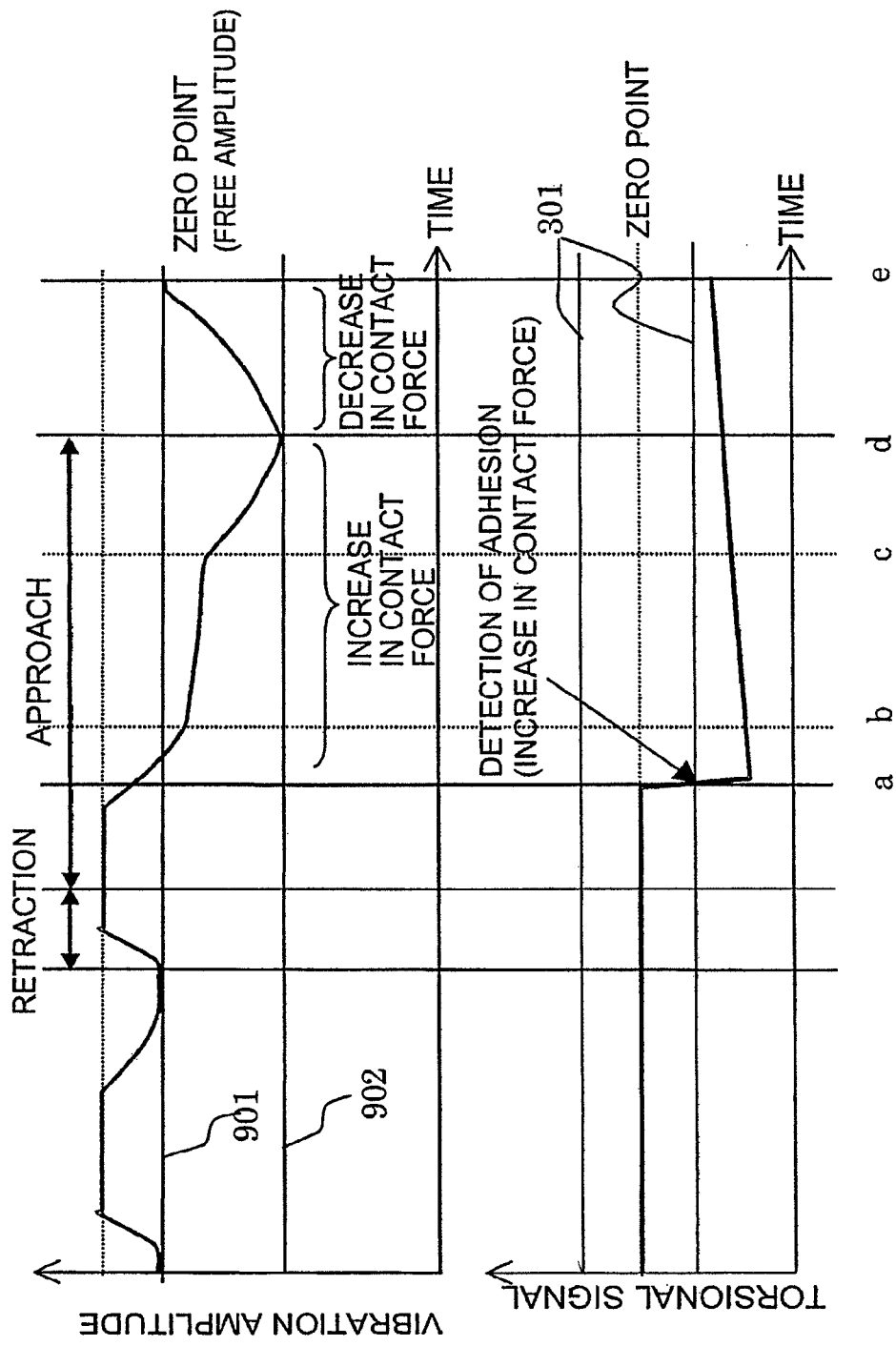
FIG. 17 is an explanatory view illustrating a method of increasing and decreasing a contact force between a probe and a side wall after adhesion to a side wall is detected.
Figure 18:
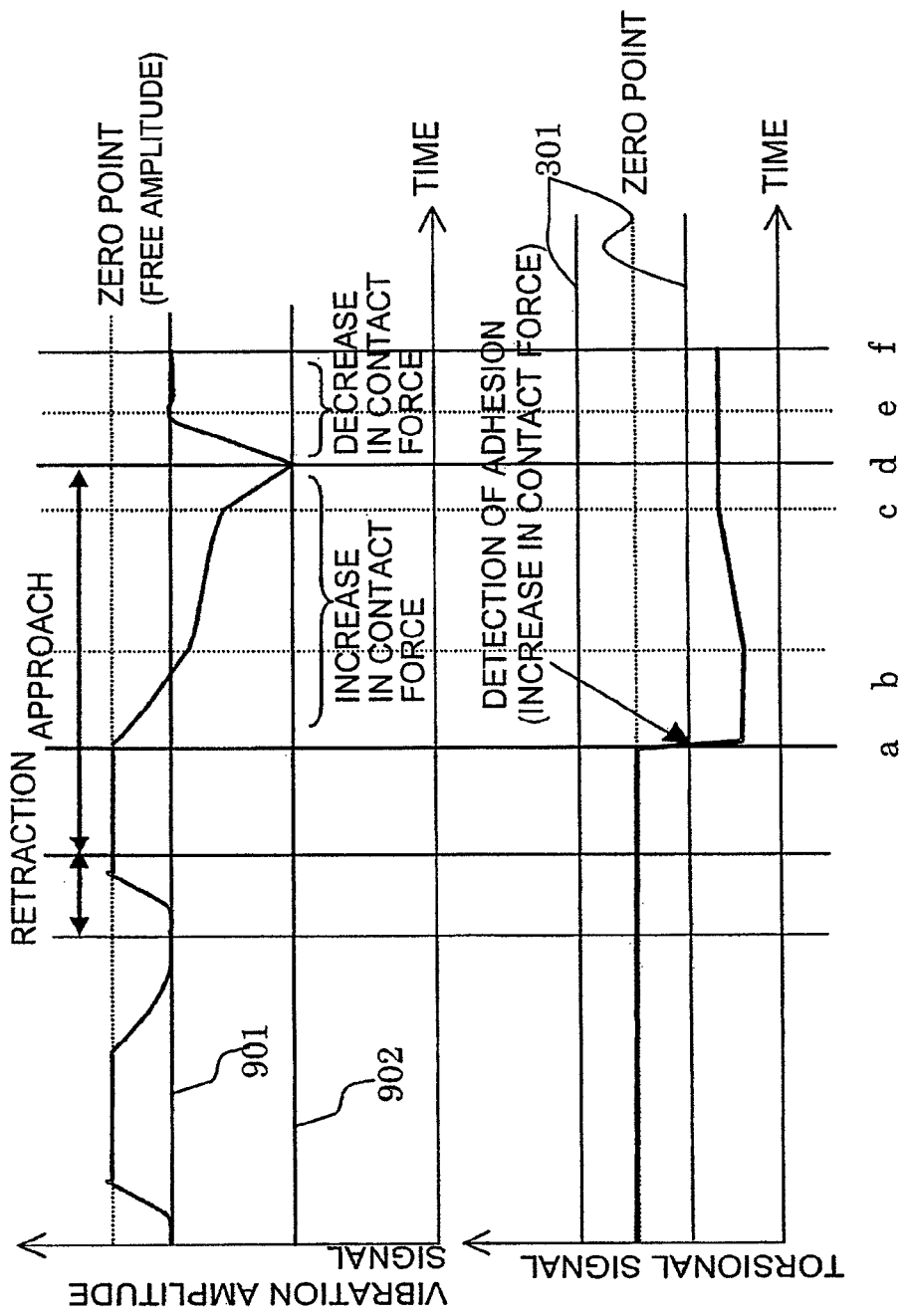
FIG. 18 is an explanatory view illustrating a method of increasing and decreasing a contact force between a probe and a side wall after adhesion to a side wall is detected.

When the adhesion of the probe to the side wall is detected by the above method, the contact force between the probe and the sample is increased to cause the probe to reach the side wall bottom portion. This method will be described with reference to FIG. 17 and FIG. 18 illustrating the flexural vibration amplitude signal and the torsional signal at the time of measurement. As shown in FIG. 17, after the probe contacts the sample, the probe is lowered toward the sample until the contact force between the probe and the sample reaches a contact force target value 901 for obtaining measurement data. Two types of target values, the contact force target value 901 for obtaining data and a contact force target value 902 (contact force larger than 901) for increasing the contact force, are provided as the contact force target value. By performing force servocontrol by setting the target value to 902, or by lowering the probe onto the sample at a constant speed until the contact force reaches 902, the contact force can be increased.

Furthermore, in the present measuring method, the increase in the contact force can be also controlled to the minimum necessary by detecting the arrival of the probe at the side wall bottom portion. As shown in FIG. 18, when the contact force between the probe and the sample is increased at a constant rate, the flexural vibration amplitude decays at a constant change rate until the probe starts to slip on the side wall portion (zone a-b). When the contact force reaches a given value, the probe starts to slip on the side wall portion, and thus, the change rate of the flexural vibration becomes smaller (zone b-c). When the probe reaches the side wall bottom portion, the probe stops slipping, and thus, the amplitude change rate of the flexural vibration becomes larger again to be equal to that before the slipping occurs (zone c-d). Accordingly, by observing the amplitude change rate of the flexural vibration after changing the contact force to 902, and detecting a change point (time c) of the amplitude change rate of the flexural vibration occurring when the probe reaches the pattern bottom portion, the arrival of the probe at the pattern can be detected. However, while the probe is slipping on the side wall portion, the amplitude change rate of the flexural vibration may momentarily become larger due to a shape change of the side wall surface, a local increase in frictional force between the probe and the sample, or the like. Thus, there is a possibility that the determination is wrong if the change in the amplitude change rate of the flexural vibration is simply detected. Therefore, pushing of the probe into the sample may be stopped by determining that the probe reaches the side wall bottom portion when the decay rate of the vibration amplitude of the flexural vibration lasts for a certain period of time or more after the time c.

Figure 11:
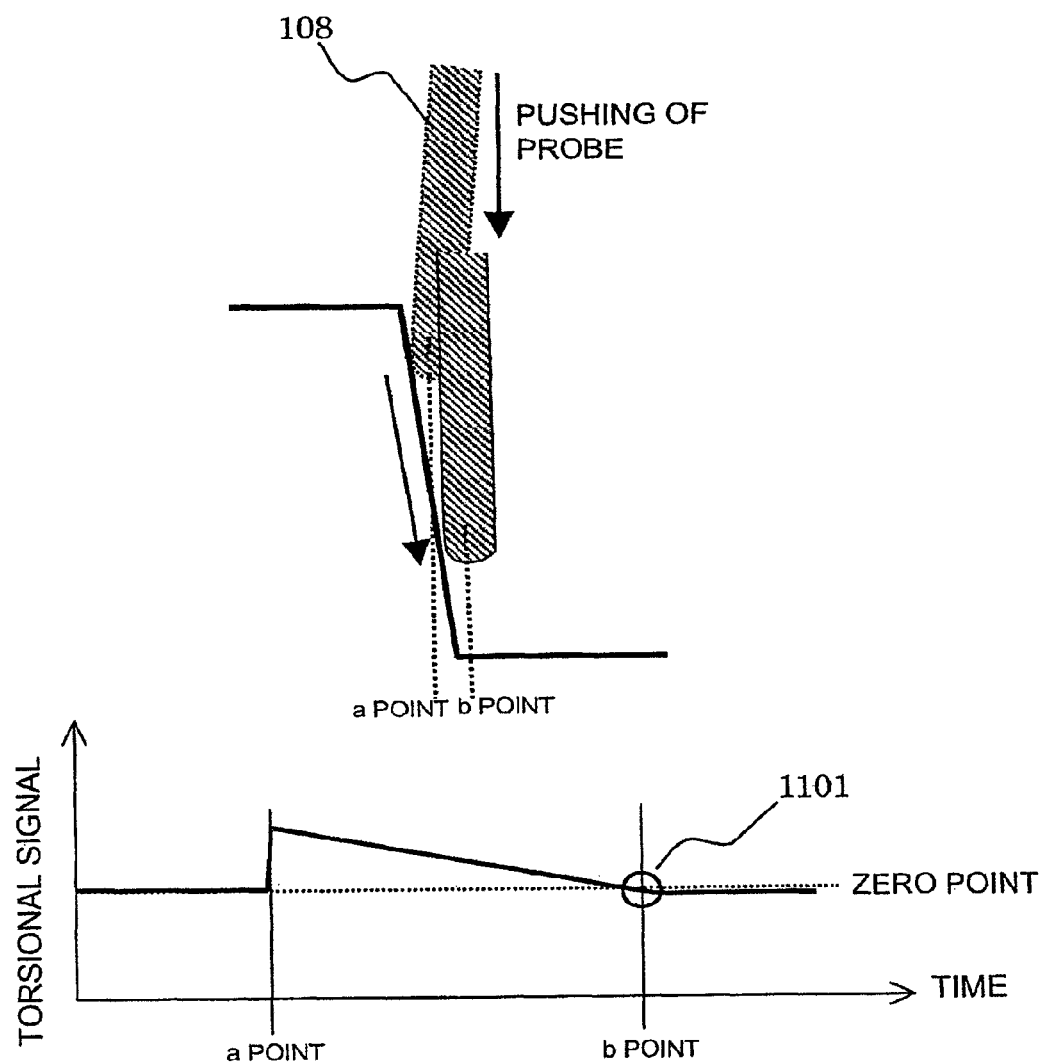
FIG. 11 is an explanatory view illustrating a method of increasing a contact force using the amount of torsion of a cantilever after adhesion to a side wall is detected.

Also, as described in the embodiment 1, for example, when the side wall is not vertical but has a tapered shape, it is only necessary that the probe reaches a position (b point in FIG. 11) which the probe can reach when the probe does not adhere to the side wall as shown in FIG. 11. Accordingly, by starting to observe the amount of torsion of the cantilever at the same time as detecting the arrival at the side wall bottom portion, and stopping the pushing of the probe into the sample in a position where the torsion of the cantilever caused by the adhesion disappears (the amount of torsion is zero), excessive pushing of the probe into the sample can be eliminated. Practically, at the moment when the torsional signal crosses the zero point (1101) during the pushing of the probe into the sample, the pushing of the probe into the sample may be stopped.

However, in the method of detecting the contact force in the present measuring method (in which the contact force is detected by vibrating the probe), the vibration stops if the contact force is excessively increased, and the contact force cannot be detected. Thus, in the case where the contact force is to be increased more than the contact force by which the vibration of the probe stops, the method of detecting the contact force is switched to the method described in the embodiment 1 (in which the contact force is detected by using the amount of flexure of the probe), and the contact force is increased by the method described using FIG. 10. In this case, it is possible to detect the arrival of the probe at the side wall bottom portion and obtain the measurement data by the similar method to the method described in the embodiment 1. The measurement data may be obtained by directly using the increased contact force, or by restoring the contact force to the same contact force as those of other measuring points at the time when the probe reaches the side wall bottom portion as described in the embodiment 1. In the case where the former method is used, a height error (Equation (1)) due to a difference in the contact force with other measuring points is corrected by Equation (2).

Also, in the case where the latter method is used, force servocontrol may be performed by setting the target value of the force servocontrol to the contact force target value 901 again as shown in a zone d-e in FIG. 17. Alternatively, as shown in a zone d-e in FIG. 18, the probe may be raised from the sample at a constant speed until the contact force reaches the contact force target value 901, and after the contact force returns to the vicinity of 901, force servocontrol may be performed by setting the target value to the contact force 901 as in a zone e-f.

Embodiment 3

Figure 12:
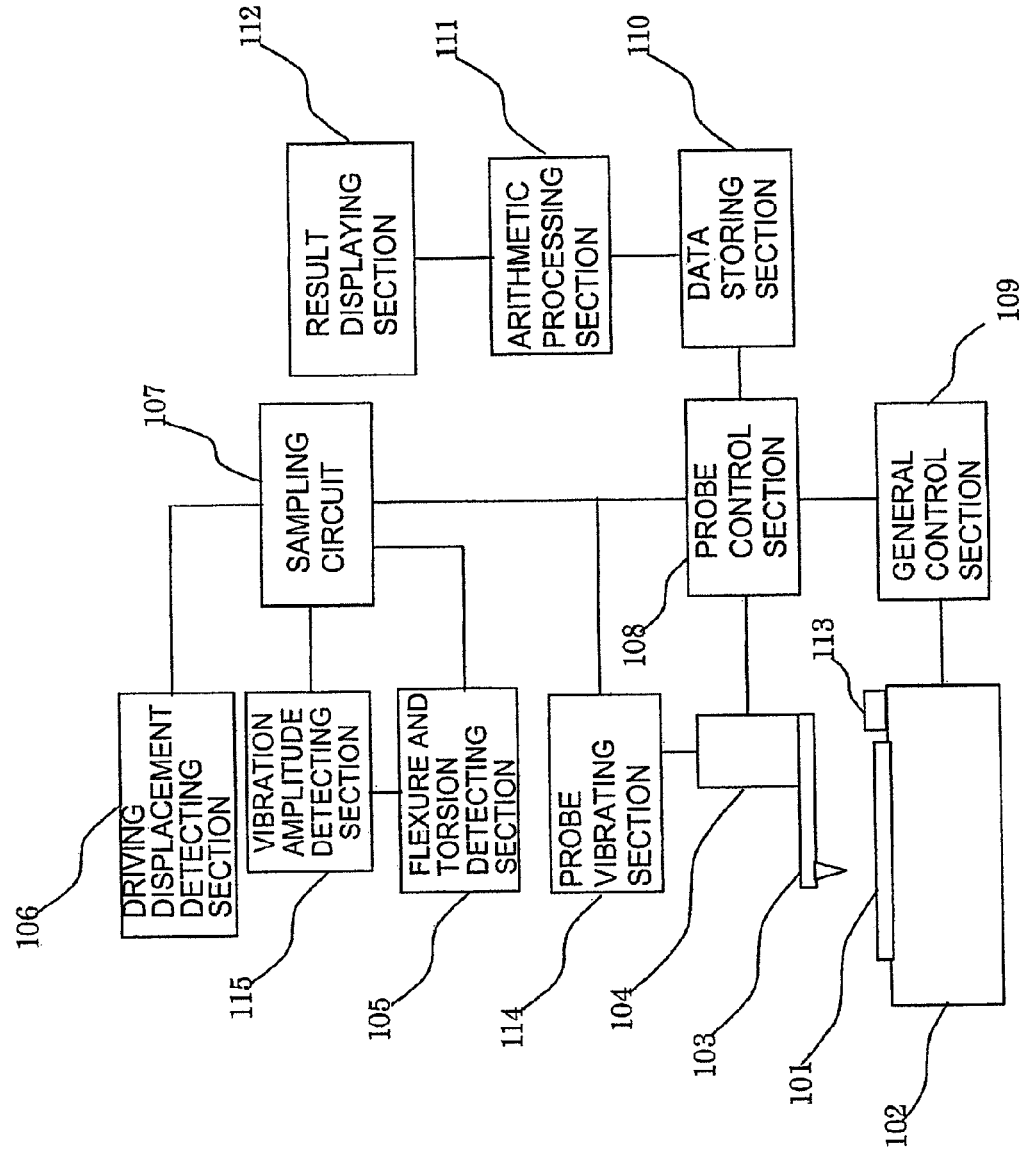
FIG. 12 is an explanatory view illustrating an apparatus configuration of a scanning probe microscope according to an embodiment 2 of the present invention.

A method of measuring the depth of a groove pattern using an elongated probe in a cyclic contact mode method or a method in which the cyclic contact mode and a vibration in the direction of torsion are combined (flexural vibration plus torsion vibration) will be described below. A configuration example of a scanning probe microscope according to the present invention is shown in FIG. 12. The descriptions of the respective sections are the same as those in the embodiment 2.

Figure 19A:
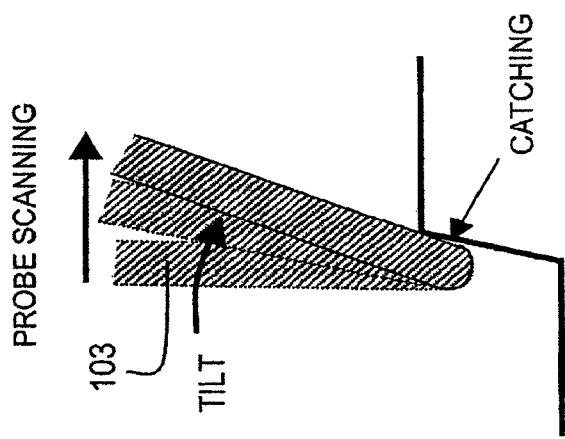
FIGS. 19(A) and 19(B) are explanatory views illustrating one example of a probe action in a scanning probe microscope of a cyclic contact mode method according to an embodiment 3 of the present invention.

In the following, a method of measuring a microscopic concave-convex pattern using the elongated probe will be described. The cyclic contact mode method is a method in which probe scanning is performed with the probe vibrated in the direction of flexure by the probe vibrating section 114 dynamically contacting the sample surface. In the case where the probe is moved from left to right of the groove pattern, the probe adheres to the left side wall of the groove, and the tilt of the probe is increased by performing scanning with the probe being held by the side wall. The torsion of the cantilever is also gradually increased (see FIG. 19(A)). By detecting the torsion of the cantilever at this time, the adhesion of the probe to the side wall can be detected. As to the torsion of the cantilever, the same signal as those in the embodiments 1 and 2 can be detected by the flexure and torsion detecting section 105.

Figure 19B:
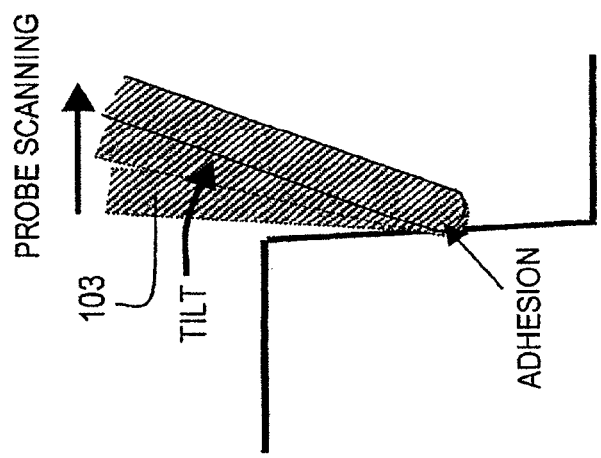

However, since the probe is continuously moved in the scanning direction of the probe in the present measuring method, the response speed of probe control is slow. The torsion also occurs when the probe cannot follow the shape change of the measured pattern (when the probe catches on the pattern). Moreover, the torsion of the cantilever at this time is in the same direction as the torsion caused by the adhesion to the left side wall of the groove described above (see FIG. 19(B)).

Therefore, as in the description of FIG. 3, when the amount of torsion of the probe (the torsion in the direction in which the probe tip rotates in the left direction) reaches a given value or more in the case where the magnitude of the height change rate of the measured profile reaches a given value or more and the sign thereof is minus (occurring during the movement of the probe in the left side wall of the groove portion), it is possible to determine that the torsion is caused by the adhesion of the probe to the side wall. Also, concerning the case where the probe is moved in the opposite direction to the above direction (the case where the probe is moved from right to left of the groove pattern), when the amount of torsion of the probe (the torsion in the direction in which the probe tip rotates in the right direction) reaches a given value or more in the case where the magnitude of the height change rate of the measured profile reaches a given value or more and the sign thereof is plus (occurring during the movement of the probe in the right side wall of the groove portion), it is possible to determine that the probe adheres to the side wall. According to this method, the adhesion of the probe to the side wall can be detected by distinguishing the adhesion from the case in which the probe catches on the pattern. Also, the method described above can be also applied to the scanning method in which the cyclic contact mode and the vibration in the direction of torsion are combined. When the probe adheres to the side wall in this method, scanning is performed with the probe being held by the side wall and the torsion of the cantilever as shown in FIG. 19 occurs also in this method. Thus, the adhesion of the probe to the side wall can be detected by detecting the torsion of the cantilever as in the case of the cyclic contact mode method.

After the adhesion of the probe to the side wall is detected, the contact force is increased. At this time, the scanning of the probe may be stopped until the increase in the contact force is finished such that the probe can reliably reach the groove bottom. A method of increasing the contact force is as described above using FIG. 17 and FIG. 18 in the embodiment 2. The detection of the arrival of the probe at the side wall bottom portion described using FIG. 18 can be also used in the present method.

Also, as described in the embodiment 2, there is a limit to the magnitude of the contact force to be increased (the vibration of the probe stops when the contact force is increased) in the present method of detecting the contact force (in which the probe is vibrated). Thus, in the case where the contact force is to be increased greater than the limit value, the method of detecting the contact force is switched to the method described in the embodiment 1 (in which the contact force is detected by using the amount of flexure of the probe), and the contact force is increased by using the methods described using FIG. 9 and FIG. 10.

In this case, it is possible to detect the arrival of the probe at the side wall bottom portion and obtain the measurement data by the similar method to the method described in the embodiment 1. As the measuring method, a measurement may be performed by directly using the increased contact force, or by restoring the contact force to the same contact force as those of other measuring points at the time when the probe reaches the side wall bottom portion as described in the embodiment 1. In the case where the former method is used, a height error (Equation (1)) due to a difference in the contact force with other measuring points is corrected by Equation (2).

Also, in the case where the latter method is used, as the method of restoring the contact force, force servocontrol may be performed by setting the target value of the force servocontrol to the contact force target value 901 again as shown in a zone d-e in FIG. 17. Alternatively, as shown in a zone d-e in FIG. 18, the probe may be raised from the sample at a constant speed until the contact force reaches the contact force 901, and after the contact force returns to the vicinity of 901, force servocontrol may be performed by setting the target value to the contact force 901 as in a zone e-f.

The method of detecting the adhesion of the probe to the side wall during probe scanning is described in the embodiments 1 to 3. However, since the adhesion of the probe occurs in the pattern side wall portion, the contact force may be increased without detecting the torsion of the cantilever when the probe reaches the side wall portion. The method shown in FIG. 2 in the embodiment 1 (in which the threshold is provided in the height change rate of the measured profile) is used to detect the pattern side wall portion. Also, the shape data of the measured pattern may be obtained in a first measurement to identify the side wall position of the pattern from the obtained shape data, and the contact force may be increased when the probe reaches the identified side wall position in a second measurement. A method of detecting the arrival at the side wall bottom after increasing the contact force and obtaining the measurement data is as described in the embodiments 1, 2 and 3.

Embodiment 4

Figure 20:
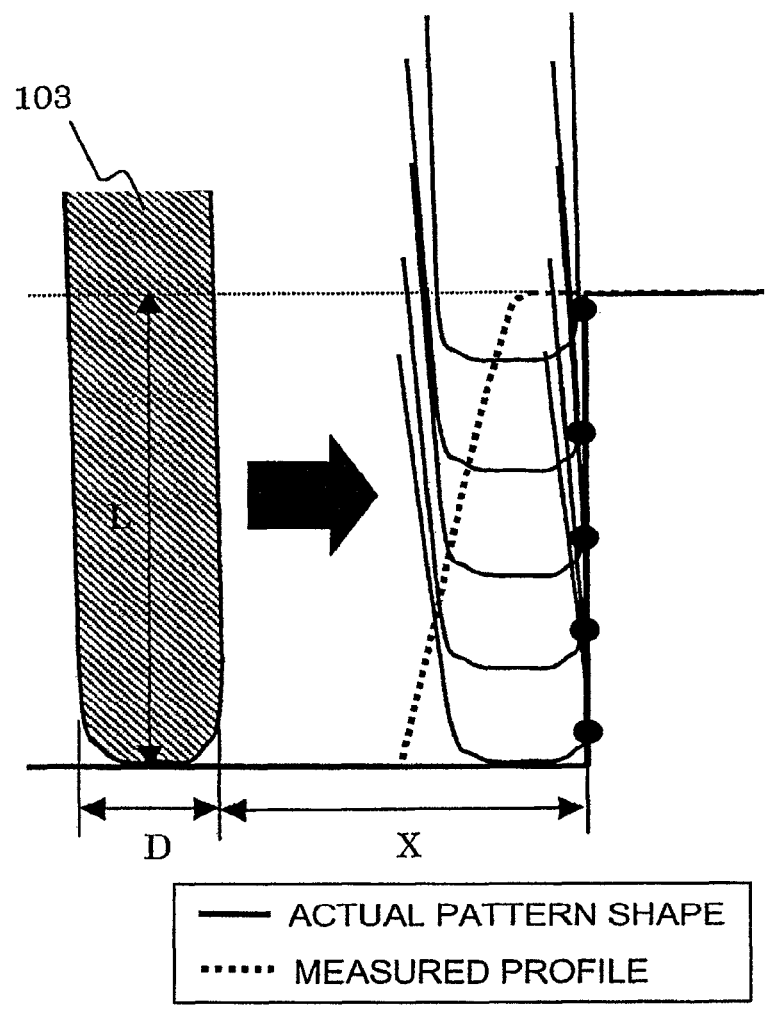
FIG. 20 is an explanatory view illustrating adhesion of a probe in a side wall portion according to an embodiment 4 of the present invention.
Figure 21:
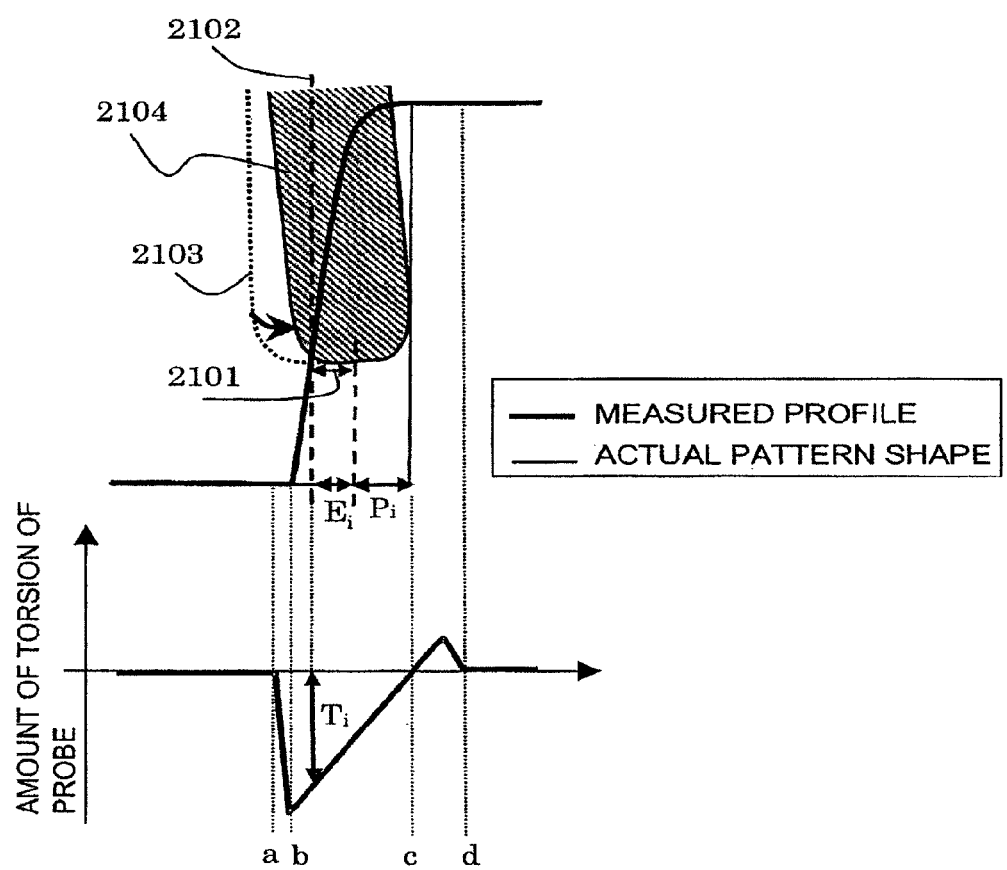
FIG. 21 is an explanatory view illustrating a measured profile and the amount of torsion of a cantilever at the time of measuring a 90-degree sidewall.

A method of measuring the width of a convex pattern using an elongated probe will be described below. In the present invention, in addition to the shape data, the data of the amount of torsion of the cantilever is obtained by the flexure and torsion detecting section 105 at the time of measurement, and a profile error caused by the adhesion of the probe to the side wall is corrected by using the data of the amount of torsion. First, the profile error of the side wall portion caused by the adhesion of the probe to the side wall will be described. When the probe approaches the side wall of the pattern, the probe is attracted to the side wall due to the van der Waals forces acting between the probe and the side wall. The probe adheres to the pattern side wall when a distance between the probe and the side wall reaches a given distance or less. The van der Waals forces acting between the probe and the side wall depend on a distance: X between the probe and the side wall, and the volume of the probe facing the side wall as shown in FIG. 20. As the distance between the probe and the side wall is smaller and the volume of the probe facing the side wall is larger, the forces increase. That is, in the case where a probe diameter: D and the distance: X between the probe and the side wall are constant, an adhesive force increases as an insertion distance: L of the probe into the groove or hole pattern is larger. Therefore, as shown in FIG. 21, when the distance between the probe and the side wall is large, the adhesion to the side wall occurs in the lower portion of the side wall where the volume facing the side wall is larger. As the distance between the probe and the side wall is smaller, the adhesion to the side wall occurs in the upper portion of the side wall. Since the distance: X between the probe and the side wall is changed according to the movement of the probe at the time of measurement, the probe adheres through the upper portion and the lower portion of the side wall depending on the distance from the side wall. When a 90-degree sidewall is measured, the side wall is measured as a tapered shape widening toward the end as shown by the measured profile in FIG. 21. It is noted that in FIG. 21, when the probe tip rotates in a clockwise direction, the torsional signal is changed in a positive direction, whereas, when the probe tip rotates in a counter-clockwise direction, the torsional signal is changed in a negative direction.

The above tapered shape (measurement error) is caused by the fact that torsion of the cantilever and deflection of probe occur at the time when the probe adheres to the side wall to deviate the probe tip position from a central axis 2102 of the measurement probe 103 (FIG. 21). In this case, since the probe adheres with the distance between the probe and the side wall being larger in the side wall lower portion, the amount of deviation of the probe tip from the central axis 2102 is larger, and the profile error resulting therefrom also increases. The profile error is proportional to the amount of torsion of the cantilever at the time of measurement. Thus, by obtaining the relationship (correction coefficient: C in the following) between the amount of torsion of the cantilever and the profile error resulting therefrom in advance, the profile error can be corrected by using Equation (3) from shape data Si' in each measuring point and data Ti of the amount of torsion of the cantilever in each measuring point.

$$Si = Sr' - C \cdot Ti \quad (3)$$

(Si: each corrected shape data, Si': each shape data)

A method of obtaining the relationship (correction coefficient C) between the amount of torsion of the cantilever Ti and the profile error Ei resulting therefrom in each measuring point described above will be described next. As a first method, a method of measuring a standard sample in which a the 90-degree sidewall is compensated, and obtaining the relationship between the amount of torsion of the cantilever caused by the adhesion to the side wall and the profile error resulting therefrom will be described. FIG. 21 illustrates the shape data and the torsion data of the cantilever at the time of measuring the 90-degree sidewall. When the distance between the probe and the side wall reaches a given distance or less, the probe is attracted to the sample. In a zone a-b, the probe is attracted to the side wall and the torsion occurs in the cantilever. The probe adheres to the side wall at the time when the distance between the probe and the side wall reaches a given distance or less (b point). In a zone b-c, the probe adheres to the side wall, and the torsion disappears at the time when the probe and the side wall are parallel to each other (c point). In a zone c-d, the torsion of the cantilever in the case where the probe slips on the side wall portion is shown, and the torsion in the opposite direction to that of the adhesion occurs. The profile error Ei occurring in the zone in which the probe adheres to the side wall corresponds to the amount of deviation 2101 of the probe tip position from the measurement probe central axis 2102. In addition, an error Pi caused by the probe shape occurs as the profile error which occurs in the side wall portion. The correction coefficient can be calculated by obtaining the amount of torsion of the cantilever Ti caused by the adhesion to the side wall at the time of measuring the 90-degree sidewall and the profile error Ei caused by the torsion of the probe at this time, and acquiring the relationship therebetween using a regression calculation such as a least squares method or the like.

Next, a second method of obtaining the correction coefficient will be described. This method is a method in which the probe is reciprocated with the probe tip contacting the pattern side wall and the correction coefficient is obtained from the relationship between the amount of torsion of the cantilever and the amount of displacement of the probe tip at this time. As shown in FIG. 22, the probe is reciprocated toward the side wall to obtain the relationship between the amount of movement of the probe and the amount of torsion of the cantilever at this time (the graph in FIG. 22). The graph in FIG. 22 will be described below. In the case where the distance between the probe and the side wall is large, there is no interaction between the probe and the side wall and no torsion occurs in the cantilever. However, when the distance between the probe and the side wall reaches a given distance or less, the probe is attracted to the side wall due to the van der Waals forces to cause the probe to adhere to the side wall and the torsion of the cantilever to occur (zone a). When the probe is further moved toward the side wall from the state in which the probe adheres to the side wall, the torsion of the cantilever increases in proportion to the amount of movement of the probe (zone b). When the probe is moved in a direction away from the side wall after the amount of torsion of the cantilever reaches a given value, the torsion of the cantilever decreases. After passing through the point where the distance between the probe and the side wall is zero (the torsion of the cantilever is zero), the state in which the probe adheres to the side wall occurs (zone c). When the probe is further moved in the direction away from the side wall, the probe is released from the adhesion state to the side wall and the torsion of the cantilever disappears (zone d). The correction coefficient can be obtained by calculating the amount of torsion of the cantilever with respect to the amount of movement of the probe (the amount of displacement of the probe tip) in the state (zone b or c) in which the probe is contacting the sample (the amount obtained by dividing the amount of torsion of the cantilever by the amount of movement of the probe: the tilt in the zone b or c in the graph of FIG. 22) in the above obtained data. A pattern having a side wall angle smaller than the opening angle of the probe tip is preferable as the sample used in the present measurement. Accordingly, the data of the amount of torsion of the cantilever at the time of giving displacement to the probe tip can be obtained even when the probe is brought into contact with any position on the side wall.

Figure 23:
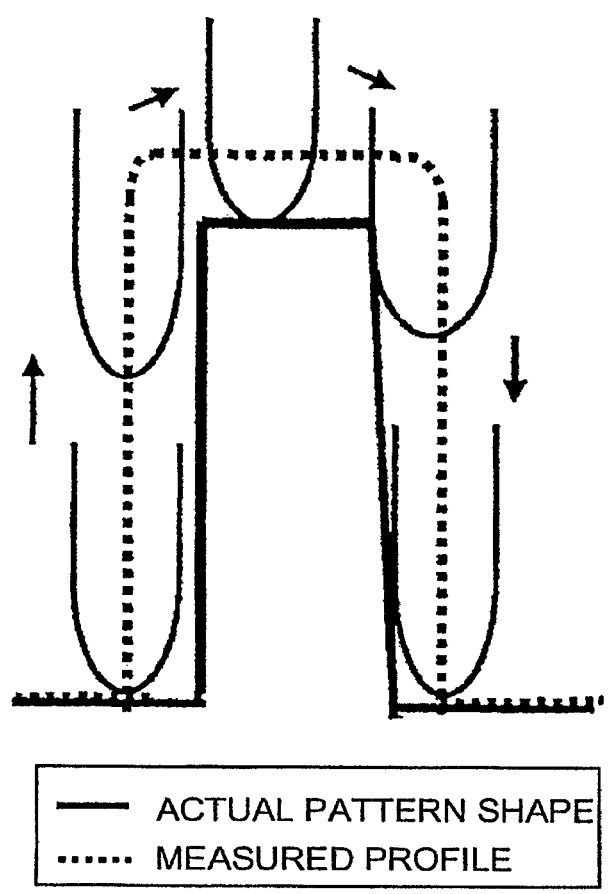
FIG. 23 is an explanatory view illustrating an error of a measured profile at the time of performing a measurement with a cylindrical probe.

Next, a method of correcting the error Pi caused by the probe shape described above will be described. For example, in the case of a CNT probe (whose tip has a slight curvature and whose side face is cylindrical), it is assumed that position deviation of the probe tip caused by the adhesion to the side wall does not occur, and when the probe is moved along an actual pattern shape, a shape including a probe shape as shown by a dotted line in FIG. 23 can be measured. The measurement error caused by the probe shape can be removed by using the methods described in Non-Patent Document 1, Non-Patent Document 2 or the like. By performing the correction in combination with the removal of the measurement error due to the deviation of the probe tip from the central axis 2102, both the measurement error caused by the position deviation of the probe tip and the measurement error caused by the probe shape can be removed.

Figure 24:
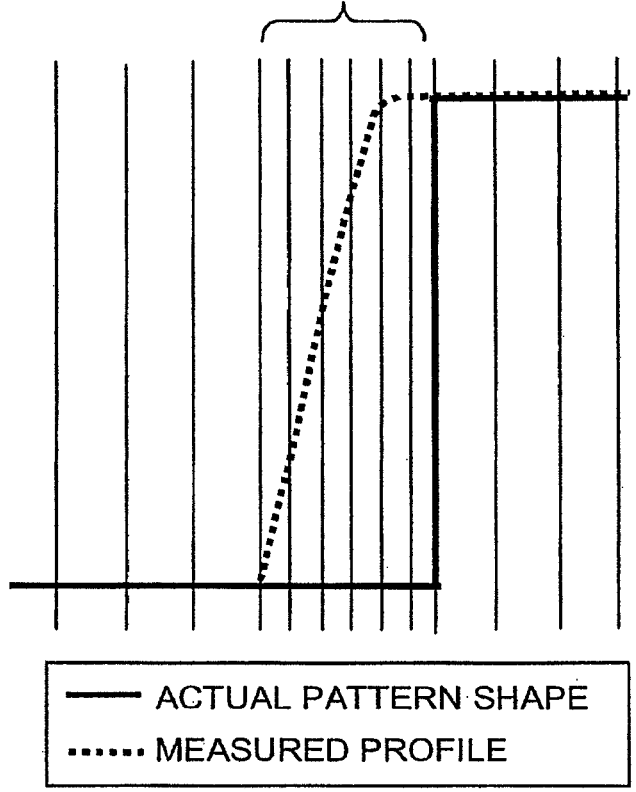
FIG. 24 is an explanatory view illustrating a method of increasing the number of measuring points on a side wall portion.

Next, a method of measuring a side wall shape in detail will be described. If the entire area of a pattern is measured at the same measurement intervals, the number of measuring points on a steep side wall portion becomes very small. It is therefore effective to increase the number of contact points (the number of measuring points) of the probe with the side wall portion in order to measure the shape of the side wall in detail, and when the probe reaches the side wall portion, the interval between the measuring points is reduced to increase the number of contact points of the probe with the side wall (see FIG. 24). The method shown in FIG. 2 in the embodiment 1 (in which the threshold is provided in the height change rate of the measured profile) can be used as a method of detecting the side wall portion. Alternatively, that the probe adheres to the side wall portion may be utilized to determine that the probe reaches the side wall portion when the adhesion is detected. Any of the methods described in the embodiment 1 can be used as a method of detecting the adhesion.

Figure 25:
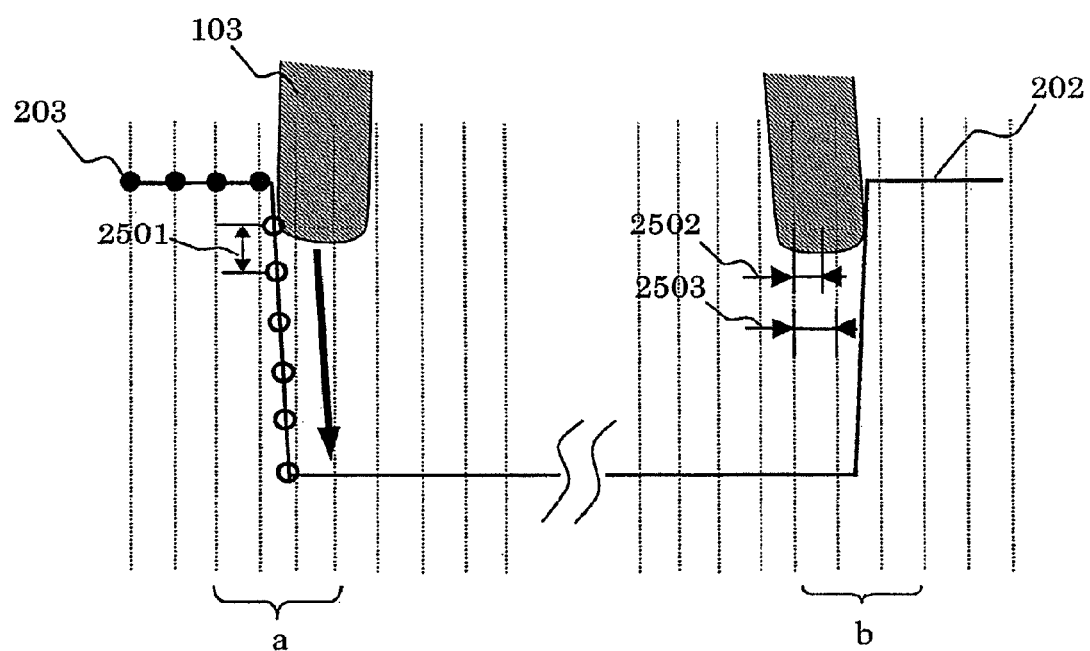
FIG. 25 is an explanatory view illustrating a method of increasing the number of measuring points on a side wall portion.

Also, as another method of increasing the number of measuring points on the side wall portion, a measurement may be performed at a given height interval with the probe slipping on the side wall by increasing the contact force when the arrival of the probe at the side wall is detected by the above method. When the probe is caused to slip, it is not possible to obtain the data of the entire surface of the side wall unless the probe adheres to the upper portion of the side wall. In the case where the tilt of the side wall is downward with respect to a measurement direction as shown in a zone a in FIG. 25, the probe adheres to the upper portion of the side wall first and adheres to the lower portion of the side wall at the end. Accordingly, the state in which the adhesion is detected in the side wall portion first is the state in which the probe adheres to the upper portion of the side wall, and the measurement may be performed at a given height pitch 2501 while causing the probe to slip by increasing the contact force at this moment. However, in the case where the tilt of the side wall is upward with respect to a measurement direction as shown in a zone b in FIG. 25, the probe adheres to the lower portion of the side wall first and adheres to the upper portion of the side wall at the end. Therefore, it becomes necessary to detect the state in which the probe adheres to the upper portion of the side wall. As the probe approaches the side wall, the probe adheres to the upper portion of the side wall and the amount of deviation of the probe tip position from the central axis 2102 of the measurement probe at the time of obtaining data is gradually smaller. Furthermore, when the amount of deviation 2502 of the probe tip position from the central axis 2102 is smaller than a measuring point interval 2503, a next measuring point is out of the side wall and this state is the state in which the probe adheres to the upper portion of the side wall. Accordingly, the state in which the probe adheres to the upper portion of the side wall is detected by comparing the amount of torsion of the cantilever and the measuring point interval, and the measurement may be performed at the given height pitch 2501 while causing the probe to slip by increasing the contact force. Any of the methods described in the embodiment 1 may be used as a method of detecting the torsion of the cantilever used herein, and the methods described in the embodiment 1 may be also used as a method of increasing the contact force.

Furthermore, the width of the convex portion can be measured by obtaining the right and left side wall shapes of the convex pattern by using the above correction method. Although the method of correcting the shape in the convex pattern is described in the present embodiment, the present invention is not limited to the convex shape, and it is obvious that the present invention can be also applied to a concave shape.

A microscopic pattern shape having a high aspect ratio can be measured, and by using the present invention for research and development in the fields of semiconductors and storages in which patterns will be further reduced in size in the future, the efficiency of research and development can be improved. Also, by applying the present technique to commercial production management in the fields, the product yield can be improved.

What is claimed is:

1. A scanning probe microscope for scanning a sample surface with a probe formed on a cantilever and detecting an interaction acting between the probe and the sample surface to measure a physical property including a surface shape of the sample, comprising means for detecting a side wall portion of a measured pattern based on an increase in a contact force in a depth direction between the probe and the sample when the probe reaches the side wall portion of a measured pattern.

2. The scanning probe microscope according to claim 1, wherein the measured pattern side wall portion is detected by analyzing a height change rate of a measured profile.

3. The scanning probe microscope according to claim 1, further comprising means for detecting vibration amplitude of the probe and flexure of the probe, wherein the contact force is increased by changing a method of detecting the contact force by analyzing the vibration amplitude of the probe to a method of detecting the contact force by analyzing an amount of flexure of the cantilever.

4. The scanning probe microscope according to claim 1, wherein the contact force is increased until the contact force reaches a predetermined contact force target value.

5. The scanning probe microscope according to claim 1, further comprising means for detecting flexure of the probe or vibration amplitude of the probe, wherein a change rate of an amount of flexure of the cantilever or a change rate of flexural vibration amplitude of the cantilever after increasing the contact force is analyzed and the contact force is increased until a change in the change rate of a given value or more is detected.

6. The scanning probe microscope according to claim 1, further comprising means for detecting torsion of the cantilever, wherein a magnitude of an amount of torsion of the cantilever after increasing the contact force is observed and the contact force is increased until the amount of torsion disappears.

7. The scanning probe microscope according to claim 1, wherein a surface shape is measured by using the increased contact force and a profile error due to a difference in the contact force with a measuring point where a contact force is not increased is corrected.

8. The scanning probe microscope according to claim 1, wherein a measurement is performed after decreasing the increased contact force to the contact force before being increased.

9. The scanning probe microscope according to claim 1, wherein the detecting means includes means for detecting when a bottom of the sidewall portion has been reached based on a change in the rate of increase in the contact force when the probe reaches the bottom of the sidewall portion.

* * * * *